(12) United States Patent
Nagaraja et al.

(10) Patent No.: US 8,219,654 B2
(45) Date of Patent: Jul. 10, 2012

(54) HIGHLY AVAILABLE CENTRAL CONTROLLER TO STORE AND ENFORCE VALID STATE TRANSITIONS OF DISTRIBUTED COMPONENTS

(75) Inventors: Girish Nagaraja, Kirkland, WA (US); Supin Ko, Seattle, WA (US); Vishal Mishra, Sammamish, WA (US); David A. Nichols, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 11/750,212

(22) Filed: May 17, 2007

(65) Prior Publication Data

US 2008/0288637 A1 Nov. 20, 2008

(51) Int. Cl.
*G06F 15/173* (2006.01)
(52) U.S. Cl. ......................... 709/223; 709/217; 718/104
(58) Field of Classification Search .................. 709/217, 709/223; 718/104
See application file for complete search history.

(56) References Cited

U.S. PATENT DOCUMENTS

| | | | |
|---|---|---|---|
| 6,098,093 A * | 8/2000 | Bayeh et al. .................. | 709/203 |
| 6,266,666 B1 | 7/2001 | Ireland et al. | |
| 6,954,748 B2 | 10/2005 | Dettinger et al. | |
| 6,970,903 B1 | 11/2005 | Toivonen | |
| 7,082,553 B1 | 7/2006 | Wang | |
| 7,120,558 B2 | 10/2006 | McIntyre et al. | |
| 7,127,492 B1 | 10/2006 | Calo et al. | |
| 7,127,514 B2 | 10/2006 | Hunt | |
| 7,137,040 B2 | 11/2006 | Bae et al. | |
| 7,162,721 B2 | 1/2007 | Ali et al. | |
| 7,496,920 B1 * | 2/2009 | Bandhole et al. ............. | 718/104 |
| 2004/0123183 A1 | 6/2004 | Tripathi et al. | |

FOREIGN PATENT DOCUMENTS

WO 0206956 A2 1/2002

OTHER PUBLICATIONS

Emmerich. "Distributed Component Technologies and their Software Engineering Implications," ICSE'02, May 19, 2005, 10 pages, Orlando, Florida.
Birman. "Maintaining Consistency in Distributed Systems," Cornell University Department of Computer Science, http://delivery.acm.org/10.1145/510000/506387/p8-birman.pdf?key1=506387&key2=2722575711&coll=GUIDE&dl=GUIDE&CFID=15791983&CFTOKEN=97795283, Jun. 12, 1992, 6 pages, Ithaca, New York.
Lamport. "Paxos Made Simple," http://research.microsoft.com/users/lamport/pubs/paxos-simple.pdf, Nov. 1, 2001, 14 pages.
Lamport. "The Part-Time Parliament," ACM Transactions on Computer Systems 16, May 1998, 33 pages.

* cited by examiner

*Primary Examiner* — Adnan Mirza

(57) ABSTRACT

A highly available central controller to store and enforce valid state transitions of distributed components is provided for centrally controlling access to a service. Central control is provided by a database with an API according to a set of stored procedures, which provides a virtual view to requesters that seek to read or manipulate service entities.

20 Claims, 20 Drawing Sheets

LOCKING THE STATUS OF AN ENTITY

| Current State | Availability |
|---|---|
| available | available |
| unavailable | unavailable |

Datacenter states
502

| Current State | Availability |
|---|---|
| available | available |
| unavailable | unavailable |
| internal | internal |

Sector states
504

| Current State | Availability | Activity_Level |
|---|---|---|
| available | available | active |
| unavailable | unavailable | active |
| internal | internal | active |
| shutdown | N/A | inactive |
| configchanging | N/A | configchanging |

Instance states
506

| Current State | Availability | Activity_Level | Watch | Instance_key |
|---|---|---|---|---|
| available | available | active | Null or < Now | Not null |
| availablewatch | available | active | > Now | Not null |
| unavailable | unavailable | active | N/A | Not null |
| internal | internal | active | Null or < Now | Not null |
| internalwatch | internal | active | > Now | Not null |
| quiescent | unavailable | inactive | N/A | Not null |
| unassigned | unavailable | inactive | N/A | Null |
| configchanging | unavailable | configchanging | N/A | Not null |
| datachanging * | available | active | N/A | Not null |

Repository states
508

| Current State | Availability | Activity_level | Watch | Target_repository_id |
|---|---|---|---|---|
| available | available | active | Null or < Now | Null |
| availablewatch | available | active | > Now | Null |
| unavailable | unavailable | active | N/A | Null |
| internal | internal | active | Null or < Now | Null |
| internalwatch | internal | active | > Now | Null |
| quiescent | unavailable | inactive | N/A | Null |
| beingcreated | N/A | beingcreated | N/A | Null |
| beingmoved | unavailable | unassigned | N/A | Not Null |

Account states
510

FIG. 5J

| Instance & Above | Repository | Repository State |
|---|---|---|
| Available | Available | Available |
| | AvailableWatch | AvailableWatch |
| | Internal | Internal |
| | InternalWatch | InternalWatch |
| | Unavailable | Unavailable |
| | Quiescent | Quiescent |
| | Unassigned | Unassigned |
| | ConfigChanging | ConfigChanging |
| | DataChanging | DataChanging |
| Internal | Available | Internal |
| | AvailableWatch | Internal* |
| | Internal | Internal |
| | InternalWatch | InternalWatch |
| | Unavailable | Unavailable |
| | Quiescent | Quiescent |
| | Unassigned | Unassigned |
| | ConfigChanging | ConfigChanging |
| | DataChanging | DataChanging |
| Unavailable | Available | Unavailable |
| | AvailableWatch | Unavailable |
| | Internal | Unavailable |
| | InternalWatch | Unavailable |
| | Unavailable | Unavailable |
| | Quiescent | Quiescent |
| | Unassigned | Unassigned |
| | ConfigChanging | ConfigChanging |
| | DataChanging | DataChanging |
| Shutdown | Available | Quiescent* |
| | AvailableWatch | Quiescent* |
| | Internal | Quiescent* |
| | InternalWatch | Quiescent* |
| | Unavailable | Quiescent* |
| | Quiescent | Quiescent* |
| | Unassigned | Unassigned |
| | ConfigChanging | ConfigChanging |
| | DataChanging | DataChanging |
| Null | Available | Unassigned* |
| | AvailableWatch | Unassigned* |
| | Internal | Unassigned* |
| | InternalWatch | Unassigned* |
| | Unavailable | Unassigned* |
| | Quiescent | Unassigned* |
| | Unassigned | Unassigned* |
| | ConfigChanging | ConfigChanging |
| | DataChanging | DataChanging |
| ConfigChanging | Available | ConfigChanging |
| | AvailableWatch | ConfigChanging |
| | Internal | ConfigChanging |
| | InternalWatch | ConfigChanging |
| | Unavailable | ConfigChanging |
| | Quiescent | ConfigChanging |
| | Unassigned | Unassigned* |
| | ConfigChanging | ConfigChanging |
| | DataChanging | ConfigChanging* |

FIG. 5L

| Repository & Above | Account | Account State | Repository & Above | Account | Account State |
|---|---|---|---|---|---|
| Available | Available<br>AvailableWatch<br>Internal<br>InternalWatch<br>Unavailable<br>Quiescent<br>BeingMoved<br>BeingCreated | Available<br>AvailableWatch<br>Internal<br>InternalWatch<br>Unavailable<br>Quiescent<br>BeingMoved<br>BeingCreated | Unavailable | Available<br>AvailableWatch<br>Internal<br>InternalWatch<br>Unavailable<br>Quiescent<br>BeingMoved<br>BeingCreated | Unavailable<br>Unavailable<br>Unavailable<br>Unavailable<br>Unavailable<br>Quiescent<br>BeingMoved<br>BeingCreated |
| AvailableWatch | Available<br>AvailableWatch<br>Internal<br>InternalWatch<br>Unavailable<br>Quiescent<br>BeingMoved<br>BeingCreated | AvailableWatch*<br>AvailableWatch<br>InternalWatch*<br>InternalWatch<br>Unavailable<br>Quiescent<br>BeingMoved<br>BeingCreated | Quiescent | Available<br>AvailableWatch<br>Internal<br>InternalWatch<br>Unavailable<br>Quiescent<br>BeingMoved<br>BeingCreated | Quiescent<br>Quiescent<br>Quiescent<br>Quiescent<br>Quiescent<br>Quiescent<br>BeingMoved<br>BeingCreated |
| Internal | Available<br>AvailableWatch<br>Internal<br>InternalWatch<br>Unavailable<br>Quiescent<br>BeingMoved<br>BeingCreated | Internal<br>InternalWatch*<br>Internal<br>InternalWatch<br>Unavailable<br>Quiescent<br>BeingMoved<br>BeingCreated | Unassigned | Available<br>AvailableWatch<br>Internal<br>InternalWatch<br>Unavailable<br>Quiescent<br>BeingMoved<br>BeingCreated | Quiescent*<br>Quiescent*<br>Quiescent*<br>Quiescent*<br>Quiescent*<br>Quiescent*<br>BeingMoved<br>BeingCreated |
| InternalWatch | Available<br>AvailableWatch<br>Internal<br>InternalWatch<br>Unavailable<br>Quiescent<br>BeingMoved<br>BeingCreated | InternalWatch<br>InternalWatch<br>InternalWatch<br>InternalWatch<br>Unavailable<br>Quiescent<br>BeingMoved<br>BeingCreated | ConfigChanging | Available<br>AvailableWatch<br>Internal<br>InternalWatch<br>Unavailable<br>Quiescent<br>BeingMoved<br>BeingCreated | Unavailable*<br>Unavailable*<br>Unavailable*<br>Unavailable*<br>Unavailable*<br>Unavailable*<br>BeingMoved<br>BeingCreated |
| | | | DataChanging | Available<br>AvailableWatch<br>Internal<br>InternalWatch<br>Unavailable<br>Quiescent<br>BeingMoved<br>BeingCreated | Available<br>AvailableWatch<br>Internal<br>InternalWatch<br>Unavailable<br>Quiescent<br>BeingMoved<br>BeingCreated |

FIG. 5M

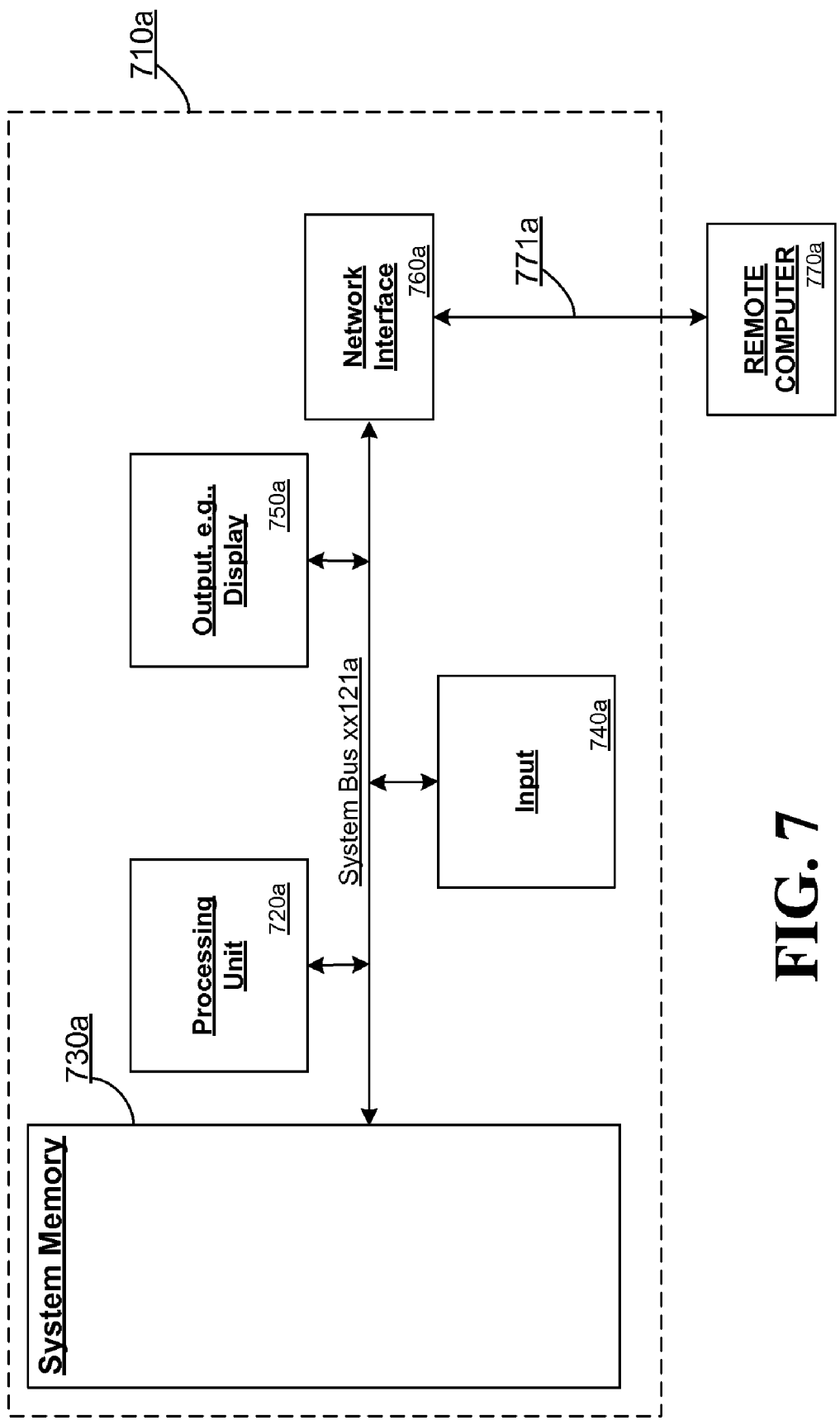

HIGHLY AVAILABLE CENTRAL CONTROLLER TO STORE AND ENFORCE VALID STATE TRANSITIONS OF DISTRIBUTED COMPONENTS

TECHNICAL FIELD

The subject disclosure generally relates to storing and enforcing valid state transitions of distributed components.

BACKGROUND

As computers and software have become more powerful, developers and vendors are providing new and more complex features to increasingly sophisticated users. Moreover, the proliferation of high-speed internet access has enabled developers and vendors to offer users and customers entirely new and even more complex services over the internet through the use web services, web applications, and application servers.

Such services, when required to support a large-scale user base or to provide a high-level of availability, are often provided in a data center using one of many service-oriented architectures (SOA). Implementation of an SOA requires tools as well as run-time infrastructure software, which is collectively referred to as an SOA implementation framework. Such frameworks have unique requirements at both the tools and infrastructure levels. These include a distributed event-enabled architecture, flexibility via service-enabled processes, enterprise standards support (fault tolerance, reliability, and scalability), security in distributed environment, visual process composition and monitoring, and support for rapid process changes and process development to enable providing new and improved user services.

For many reasons (e.g., fault tolerance, reliability, and scalability) user account entities may be distributed across many architectural components, which may be partitioned into several smaller sets. For example, in a system with thousands of accounts, each with their own set of data, it may be desirable to spread such accounts among several repositories. Each repository may hold one or more account.

However, each level of scope (e.g. repository and account) has its own state that can apply to its children. For example, if an entire repository is taken down for maintenance, all accounts in that repository are implicitly unavailable. On the other hand, if a single account is deactivated, it does not affect the state of the repository or the other accounts in the repository.

A problem can arise in the event that a process attempts to change the state of a system entity (e.g., repository, account, etc.) to an inconsistent state. As a real world example, it should not be possible for a person to change state from being "married" to being "single, never married". The only valid states after "married" might be "divorced", "widowed", or "deceased". Likewise, a user account should not be able to accessed (e.g., in an account available state) if its respective repository is taken down for maintenance (e.g., in a repository unavailable state). This problem is further exacerbated as the level of system scales to support more users and as the degree of architectural component distribution increases, because of the administrative overhead required to coordinate an increasing number of distributed components. As a result, access to the state needs to be tightly controlled in an efficient and reliable manner.

One approach to maintaining consistent states of a service's entities could be to directly poll an entity for its status and require that either the requestor (e.g., external clients, or tools) or each entity verify any requested state change, which would require direct coordination among the service's entities and the requester. However, with such a distributed access and control model, as the number of distributed components increases to support more users or to support reliability and redundancy goals, the overhead associated with such a model can become excessive. Additionally, the required intra-entity coordination among distributed components can be complex and subject to increasing conflicts as the system scales. Furthermore, the maintenance flexibility of such an approach may be hampered because of the need to manually account for the various intra-entity dependencies.

Accordingly, in consideration of the need to ensure that the system entity state is consistent and all state transitions are valid, it would be desirable to provide an efficient and reliable mechanism to control access to the system state and ensure valid state transitions of system entities.

SUMMARY

In consideration of the foregoing, the invention provides a controller to store entity status and enforce valid state transitions of distributed components. In various non-limiting embodiments, the invention can comprise using a controller interface (e.g., an API), which can comprise stored database procedures. A database can be configured similar to the disclosed schema to allow the storage and updating of the service's entity states, such that central tracking and control of the service's entities are enabled.

Furthermore, the logic of a state machine, such as within the disclosed API, provides a virtual view of the service's entities' status (e.g., partitioned accounts) and the allowed (e.g., valid) state transitions, such that requests to read and manipulate the entity states can be validated before being granted access to such entities. Thus, the controller's virtual view of the service's entity status can be provided to requesters that need to read or manipulate entity status, and such requests can be routed or disallowed depending on the validity of the requested state transition. As a result, the controller can coordinate and tightly control access to the state of the associated entities and can enforce valid entity state transitions, thus ensuring consistent entity state in the system, without the problems associated with a distributed access and control model.

Accordingly, rather than requiring a requester or an entity to directly determine each entity status and validity of requests to read or manipulate such entity status, the central controller tracks and updates entity status. Because all requests to read or manipulate the service's entities are required to use the controller for such purposes, valid state transitions can be centrally enforced while avoiding the aforementioned complications associated with distributed enforcement of valid state transitions.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

The system and methods for a highly available central controller to store and enforce valid state transitions of distributed components are further described with reference to the accompanying drawings in which:

FIG. 5J illustrates an exemplary current state matrix of possible states according to an embodiment of the present invention;

FIGS. 5K-5M illustrate an exemplary cascaded state matrix of possible states and how the cascaded states are derived for various service entities according to an embodiment of the present invention;

FIG. 7 is a block diagram representing an exemplary non-limiting computing system or operating environment in which the present invention may be implemented.

DETAILED DESCRIPTION

Overview

As mentioned in the background, SOAs need to ensure that the system state is consistent and all entity state transitions are valid. Thus it is desirable to provide an efficient and reliable mechanism to control access to the system state and ensure valid state transitions of system entities. The need is even greater as the system is scaled and becomes more distributed to meet the demands of a larger user base and to provide higher reliability.

Highly Available Central Controller to Store and Enforce Valid State Transitions of Distributed Components.

Figure 1A:
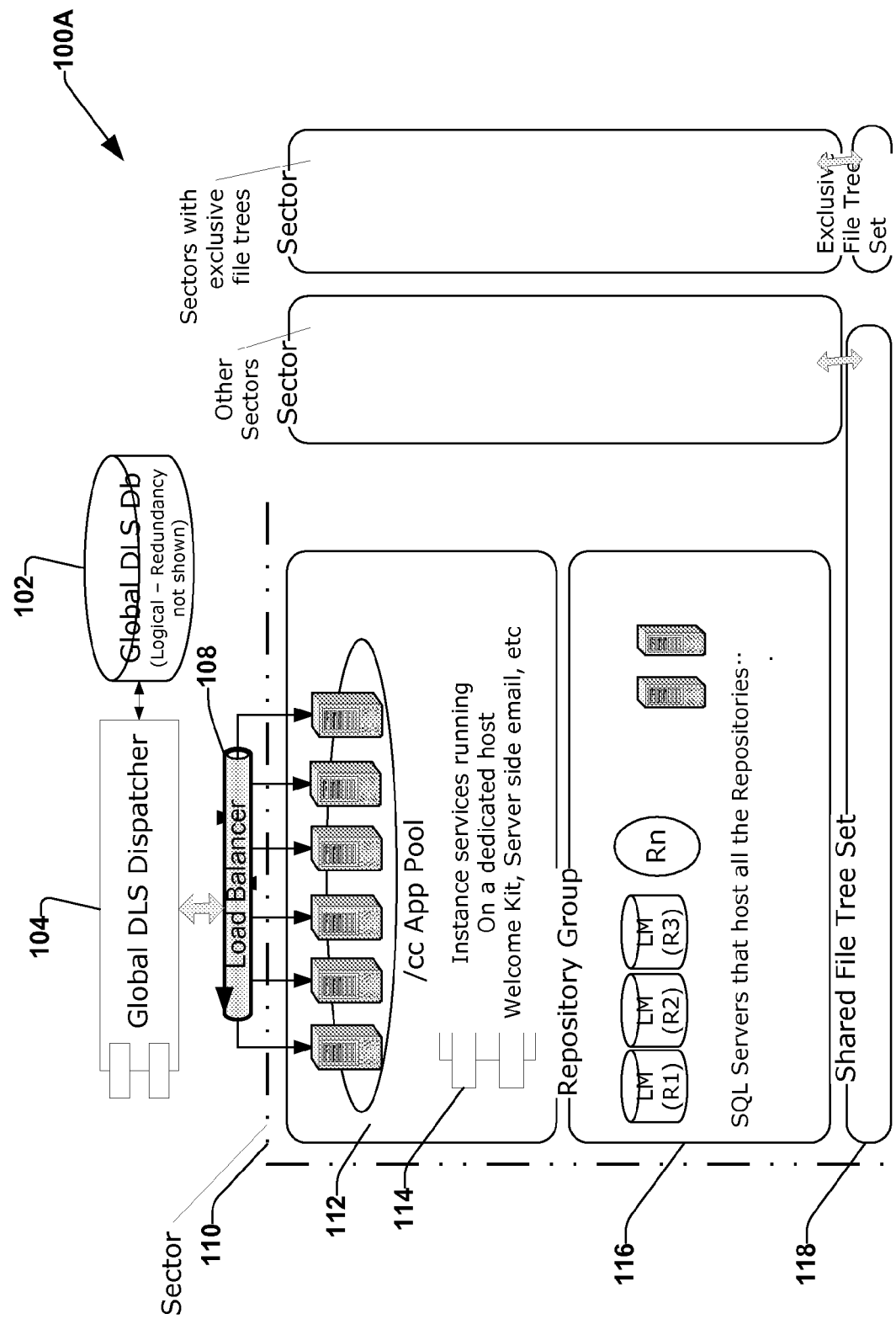
FIG. 1A illustrates an exemplary non-limiting block diagram of an architecture suitable for use of the present invention.

In order to describe the operation and benefits provided by the invention an exemplary non-limiting block diagram of a service architecture is presented which is suitable for use of the present invention. FIG. 1A shows the architecture of components of a sector 110 in a datacenter 100A. Each entity (e.g., datacenter, sector, repository, etc.) has a state associated with it. Specifically, the architecture shown is a simplified overview of a MICROSOFT LIVEMEETING (LM) service architecture. The datacenter typically contains a data locator service (DLS) dispatcher 104 to redirect all requests reaching the common LIVEMEETING.com domain to the virtual IP of the appropriate application pool (App-Pool) 112 based on the application domain and the account (not shown) referred to in the request looking it up from the DLS database 102. Among other benefits provided by the DLS database, a list of supported applications and their internal URLs is stored in the DLS database 102.

Figure 1B:
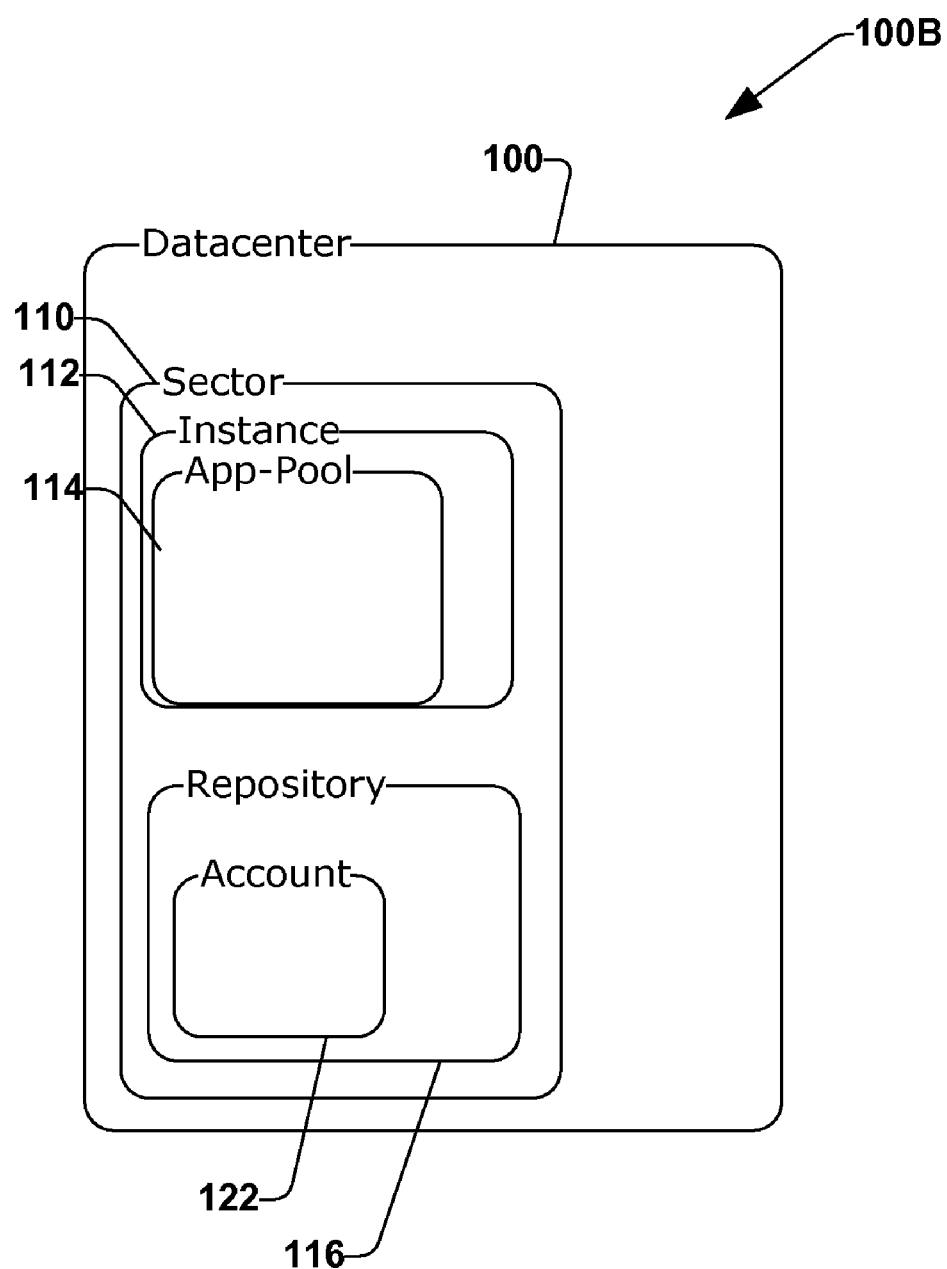
FIG. 1B illustrates an exemplary non-limiting block diagram of the various entity states to be tracked according to one aspect of the invention.

FIG. 1B illustrates an exemplary non-limiting block diagram of the various entity states (e.g., status enumeration) that can be stored and maintained according to one aspect of the invention. For example, the various states of the datacenter 100, sectors 110, App-Pool 112, instances 114, repositories 116, and accounts 122 can be centrally stored and valid state transitions can be centrally enforced among the distributed components in the datacenter according to one aspect of the present invention.

Figure 1C:
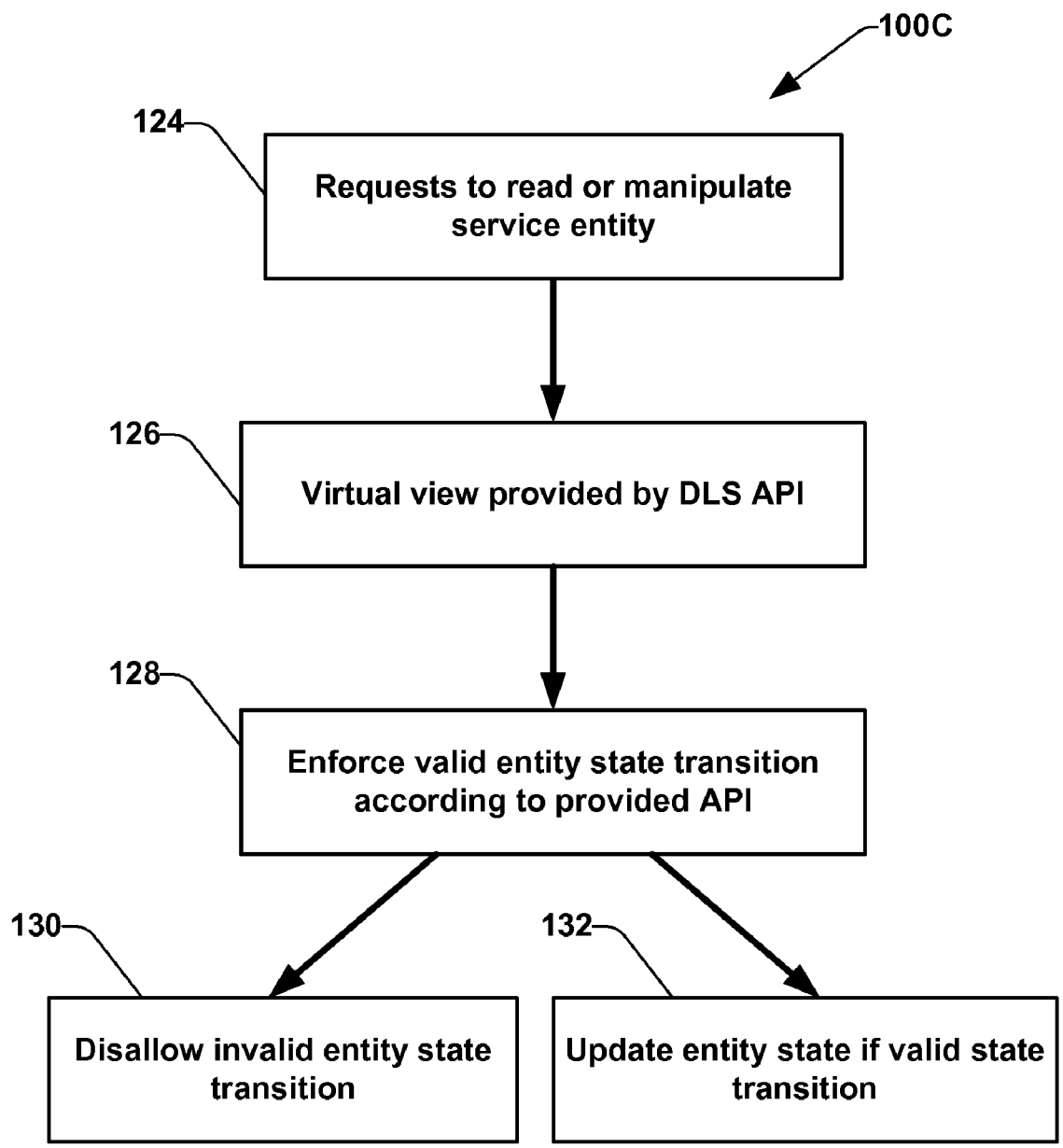
FIG. 1C illustrates an exemplary non-limiting block diagram of a method for centrally controlling access to a service according to one aspect of the invention.

FIG. 1C is a flow diagram showing an exemplary non-limiting process for centrally controlling access to a service in accordance with the invention. At 124 a request to read or manipulate an entity of the service (e.g., an account) is formed according to a virtual view 126 of the service's entities. For example, a DLS API can be provided to update or change the status of the various entities. Such an API may be in the form of a set of database stored procedures which are exposed (e.g., provide a virtual view) to handle requests to read or manipulate service entities. Depending on the nature of the request and the enumerated status, the central controller can enforce valid entity state transitions 128 by disallowing invalid state transitions or updating the entity state if the transition is valid 132. For example, if an repository holding an account is offline for maintenance, the account cannot be changed to an available state.

Figure 1D:
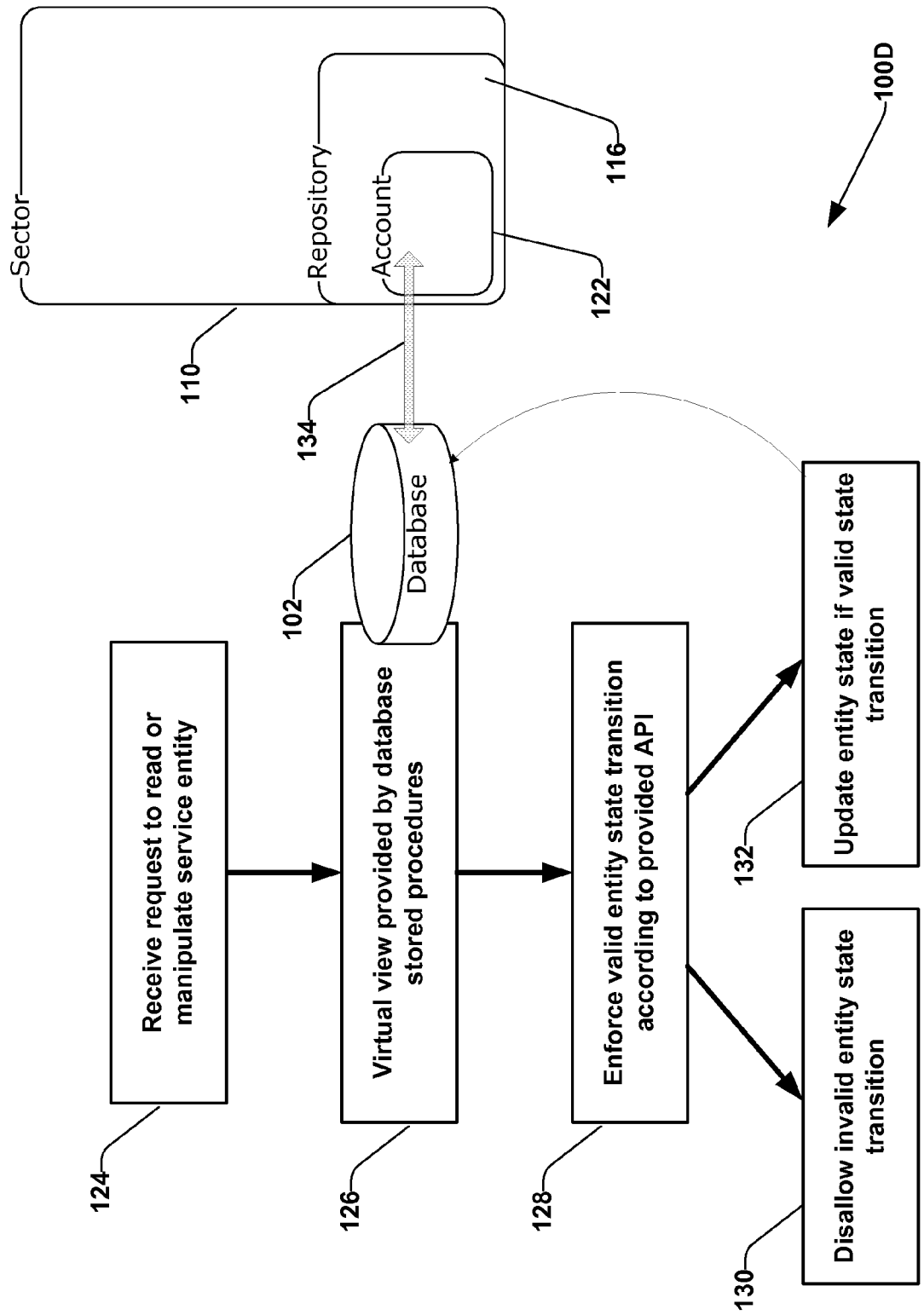
FIG. 1D illustrates an exemplary non-limiting block diagram of a system for centrally controlling access to a service according to one aspect of the invention.

FIG. 1D illustrates an exemplary non-limiting block diagram of a system for implementing the centrally-controlled access to a service according to one aspect of the invention. This further illustrates that a DLS database 102 can be used to store status enumeration 134 of various service entities and can control the process used to read and maintain service entity status. Advantageously, according to various non-limiting embodiments of the invention, a DLS database 102 can be provided to centrally control access to services in the datacenter. For example, a DLS database is provided to store status enumeration of various service entities and provide an API 126, 128 to change the status of various Entities (e.g., Datacenter, Sector, Instance, App-Pool, Repository, Account, etc.).

According to various non-limiting embodiments of the invention, central control can be maintained by making the DLS database the owner for maintaining status values of all entities in the system. Furthermore, an API set can be provided to all tools and clients that manipulate/read the status of individual entities in the system. All applications can be forced to use the DLS APIs to fetch/set the status of the entities before data in a Repository is read or updated. Additionally, the logical structure of the DLS API can form a state machine, such that by forcing all access to take place via the DLS APIs, valid state transitions can be enforced.

Figure 2:
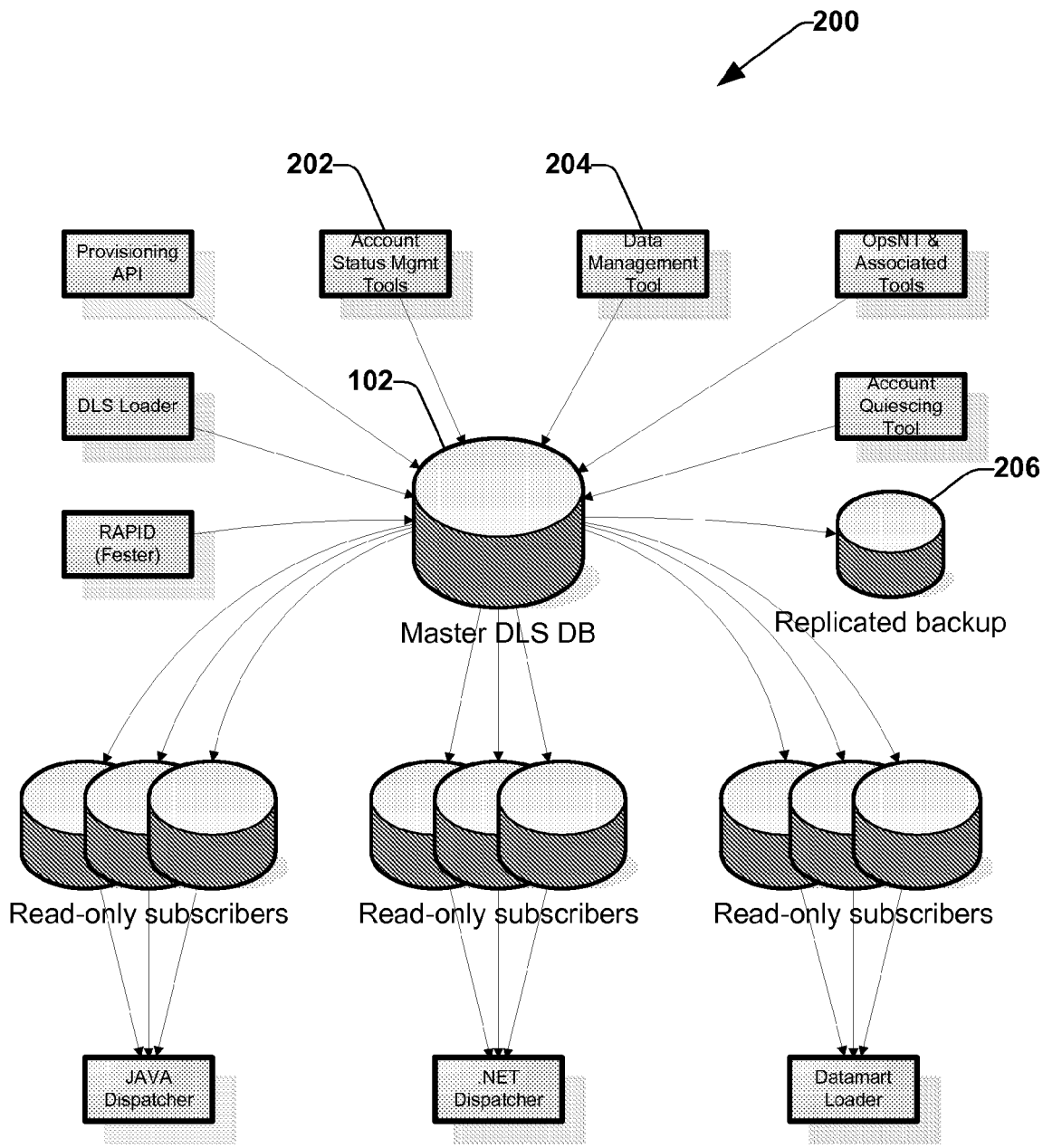
FIG. 2 illustrates an exemplary non-limiting block diagram of a master Data Locator Service (DLS) data base and its interaction with various components of the SOA according to one aspect of the present invention.

Furthermore, a set of stored of procedures can be provided in the DLS database (e.g., a DLS API) for various tools to access the status of entities in the system as shown in FIG. 2. For example, Account Status Management Tool 202 and a Data Management Tool 204 can access the status of the system entities via the stored procedures. FIG. 2 illustrates, as an exemplary non-limiting embodiment of the invention, single Master DLS writeable database and 3 read-only subscriber databases per Data Center. For example, data from the Master 102 can be replicated to the Replicated Backup 206 to provide a measure of redundancy and reliability. However, such details, are not crucial to the invention provided. As a result, the invention should not be limited to the described embodiment as other arrangements and advantages provided according to the invention will become apparent to one skilled in the art.

Details of the various aspects of exemplary, non-limiting embodiments of the invention have been briefly described to help enable a basic or general understanding of various aspects of the invention. Further details are provided below of an exemplary DLS database schema, DLS API, and DLS entity state machine diagrams to help further understand the advantages and operation of the invention.

DLS Database Schema

Figure 3:
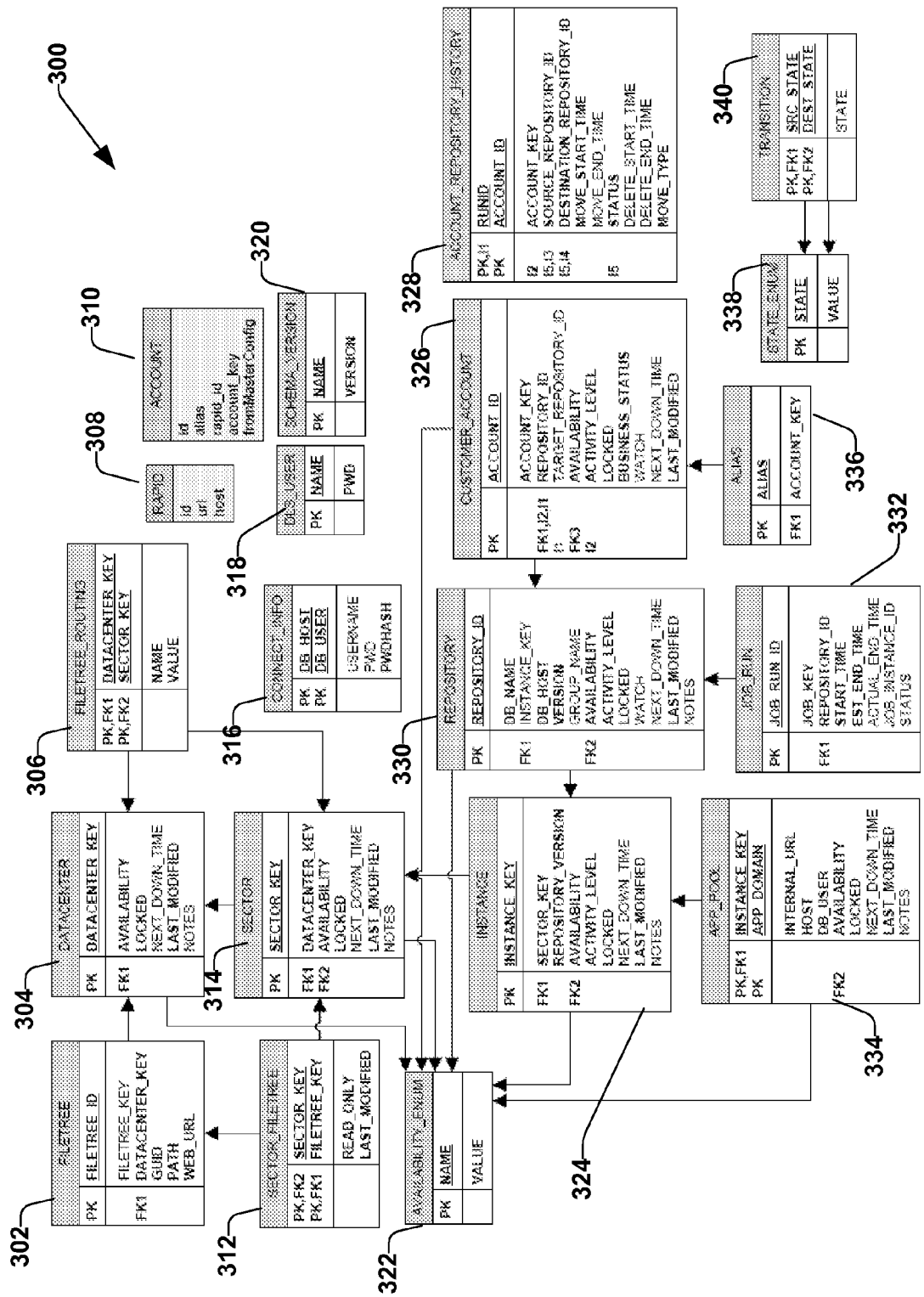
FIG. 3 illustrates an exemplary non-limiting schema for implementing one aspect of the present invention.

FIG. 3 illustrates an exemplary non-limiting database schema 300 for implementing one aspect of the present invention. The following tables and references to the FIG. 3 further describe the database schema and various acceptable values, keys, and usage in order to implement various non-limiting embodiments of the present invention. As can be seen in FIG. 3 and the following tables, a database implemented according to the schema of FIG. 3 stores for example, Datacenters, Repository groups, Sectors, Instances, Repository Filetrees, Mapping of Repositories in a group to app pools in the associated instance, Accounts and Aliases, Connection information for each application in a repository, and Status enumeration for App clusters, Repositories, Accounts. Aspects of the present invention are described with respect to a particular embodiment. However, one having ordinary skill in the art would recognize that various modification may be made to the disclosed embodiment without departing from the scope of the claimed invention. For example, although the particular embodiment discloses Rapid (308) and Account (310) views and CustomerAccount to enable backwards compatibility, one skilled in the art will understand that a new implementation of the present invention would not require backwards compatibility or other elements of the disclosed embodiment.

TABLE 1

DLS_USER (318)
DLS_USER

NAME - The name of the user
PWD - The user's encrypted password

TABLE 2

DATACENTER (304)
DATACENTER

DATACENTER_KEY - A unique human readable name for the datacenter.
AVAILABILITY - AVAILABLE, UNAVAILABLE
LOCKED - true, false
NEXT_DOWN_TIME - Indicates what time (GMT) the datacenter is scheduled to be taken offline. May be null.
LAST_MODIFIED - The last time this entry was modified.
NOTES - May be null

TABLE 3

SECTOR (314)
SECTOR

SECTOR_KEY - A unique human readable name for the sector.
DATACENTER_KEY - The datacenter to which the sector belongs
AVAILABILITY - AVAILABLE, INTERNAL, UNAVAILABLE
LOCKED - true, false
NEXT_DOWN_TIME - Indicates what time (GMT) the sector is scheduled to be taken offline. May be null.
LAST_MODIFIED - The last time this entry was modified.
NOTES - May be null

TABLE 4

INSTANCE (324)
INSTANCE

INSTANCE_KEY - A unique human readable name for the instance.
SECTOR_KEY - The sector to which the instance belongs.
REPOSITORY_VERSION - The version of the UpDown that includes all applications in the product. This is the build version string of the repository UpDown, e.g. 7.9.1530.0, etc.. May be null
AVAILABILITY - AVAILABLE, INTERNAL, UNAVAILABLE
ACTIVITY_LEVEL - ACTIVE, QUIESCENT
LOCKED - true, false
NEXT_DOWN_TIME - Indicates what time (GMT) the instance is scheduled to be taken offline. May be null.
LAST_MODIFIED - The last time this entry was modified.
NOTES - May be null

TABLE 5

APP_POOL (334)
APP_POOL

INSTANCE_KEY - The sector that this app cluster is assigned to
APP_DOMAIN - The application domain serviced by the app pool.
INTERNAL_URL - Application domain-specific data.
HOST - The host name for this app cluster. With the hardware load balancing, this will be the Virtual IP of the load balancer.
DB_USER - A key that associates a CONNECT_INFO entry to this entry.
AVAILABILITY - AVAILABLE, INTERNAL, UNAVAILABLE
LOCKED - true, false
NEXT_DOWN_TIME - Indicates what time (GMT) the app pool is scheduled to be taken offline. May be null.
LAST_MODIFIED - The last time this entry was modified.
NOTES - May be null

TABLE 6

FILETREE (302)
FILETREE

FILETREE_ID - The primary key of the filetree.
FILETREE_KEY - The string identifier of the filetree.
DATACENTER_KEY - The datacenter associated with the filetree.
GUID - The GUID that uniquely identifies the filetree.
PATH - The pw-path of the filetree.
WEB_URL - A URL fragment used to locate the customer files. Example: etc/tree/rapid . . .

TABLE 7

SECTOR_FILETREE (312)
SECTOR_FILETREE

SECTOR_KEY - The sector for this association.
FILETREE_KEY - The filetree for this association.
READ_ONLY - A Boolean that indicates whether the filetree is marked as read-only.
LAST_MODIFIED - The last time this entry was modified.

TABLE 8

FILETREE_ROUTING (306)
FILETREE_ROUTING

DATACENTER_KEY - The datacenter that this filetree entry belongs to.
SECTOR_KEY - The sector that this filetree entry belongs to.
NAME - The key for this result set entry. This looks like "ivault.filetree.count", "ivault.filetree.key.1", etc.
VALUE - The value for this result set entry.

TABLE 9

REPOSITORY (330)
REPOSITORY

REPOSITORY_ID - A unique ID for the repository.
INSTANCE_KEY - The instance that this repository is assigned to. May be null.
DB_HOST - The name of the database server. If the DB instance is named differently than that DB host, this field will combine them in the form, "host\instance".
DB_NAME - A globally unique name of the DB instance containing the repository.
VERSION - The build version of the updown for the repository. Must match INSTANCE.REPOSITORY_VERSION. May be null.
GROUP_NAME - Provides a way for Ops to logically group repositories. May be null.
AVAILABILITY - AVAILABLE, INTERNAL, UNAVAILABLE
ACTIVITY_LEVEL - ACTIVE, QUIESCENT, CONFIGCHANGING
LOCKED - true, false
WATCH - Indicates that this repository is being observed for quiescence. If not null, the column will contain a "watch until" time.
NEXT_DOWN_TIME - Indicates what time (GMT) the repository is scheduled to be taken offline. May be null.
LAST_MODIFIED - The last time this entry was modified.
NOTES - May be null

TABLE 10

CONNECT_INFO (316)
CONNECT_INFO

DB_HOST - The host that the database lives on
DB_USER - A key that associates this entry to an APP_POOL entry.
USERNAME - If the DB uses its own authentication, this is the database user name. If the DB uses Windows authentication, this field is null.
PWD - If the DB uses its own authentication, this is the DB user's unencrypted password. If the DB uses Windows authentication, this field is null.
PWDHASH - A GUID that is generated every time the connect info entry is updated. It is used to tell whether a connection pool has to be recreated due to a changed user or password.

TABLE 11

CUSTOMER_ACCOUNT (326)
(This can't be named "ACCOUNT" because of the "ACCOUNT" view)
CUSTOMER_ACCOUNT (Not named "ACCOUNT" because of the "ACCOUNT" view in one embodiment)

ACCOUNT_ID - The unique ID of the account. This ID also lives in the LM DB.
ACCOUNT_KEY - The name of the account.
REPOSITORY_ID - The repository that this account lives in.
TARGET_REPOSITORY_ID - The repository that the account is about to be moved to. May be null.
AVAILABILITY - AVAILABLE, INTERNAL, UNAVAILABLE
ACTIVITY_LEVEL - ACTIVE, QUIESCENT, BEINGMOVED, BEINGCREATED
LOCKED - true, false
BUSINESS_STATUS - OK, SUSPENDED, DEACTIVATED
WATCH - Indicates that this account is being observed for quiescence. If not null, the column will contain a "watch until" time.
NEXT_DOWN_TIME - Indicates what time (GMT) the repository is scheduled to be taken offline. May be null.
LAST_MODIFIED - The last time this entry was modified.

TABLE 12

ALIAS (336)
ALIAS

ALIAS - A unique alias for an account. There must be at least one alias per account and one alias must be the same as the account key in one embodiment.
ACCOUNT_KEY - The account that uses this alias

TABLE 13

ACCOUNT_REPOSITORY_HISTORY (328)
ACCOUNT_REPOSITORY_HISTORY

RUNID
ACCOUNT_ID
SOURCE_REPOSITORY_ID
DESTINATION_REPOSITORY_ID
MOVE_START_TIME
MOVE_END_TIME
STATUS
DELETE_START_TIME
DELETE_END_TIME
MOVE_TYPE

TABLE 14

AVAILABILITY_ENUM (322)
AVAILABILITY_ENUM

NAME - (available, unavailable, internal)
VALUE - A number corresponding to the enumeration

TABLE 15

JOB_RUN (332)
JOB_RUN

JOB_RUN_ID - The primary key of the job entry.
JOB_KEY - The type of job, e.g. processRecordings, contentExpire, or datamartAggr.
REPOSITORY_ID - The repository that the job is operating on.
START_TIME - The last time the job started
EST_END_TIME - An estimated time for the end of the job
ACTUAL_END_TIME - The actual time the job ended.
JOB_INSTANCE_ID - GUID used for optimistic locking.
STATUS - Textual message logged by the background job instance indicating success or failure.

TABLE 16

STATE_ENUM (338)
STATE_ENUM

STATE - The name of this state.
VALUE - A unique value for this state.

TABLE 17

TRANSITION (340)
TRANSITION

SRC_STATE - The state that this transition begins in.
DEST_STATE - The state that this transition ends in.

TABLE 18

SCHEMA_VERSION (320)
SCHEMA_VERSION

NAME - An arbitrary key for the entry.
VERSION - The schema version.

TABLE 19

ACCOUNT (310) (view that can exist for backwards compatibility)
ACCOUNT (view that exists for backwards compatibility in one embodiment)

id - An account ID that isn't used for anything in one embodiment.
alias - Maps directly to the ALIAS.ALIAS field.
rapid_id - An identifier that's only used to join the ACCOUNT and RAPID tables. We will use the SECTOR_ID for this field.
account_key - Maps directly to the CUSTOMER_ACCOUNT.ACCOUNT_KEY field.
fromMasterConfig - This will always be F (false) in one embodiment.

TABLE 20

RAPID (308) (view that can exist for backwards compatibility)
RAPID (view that exists for backwards compatibility in one embodiment)

id - An identifier that's only used to join the ACCOUNT and RAPID tables. We will use the SECTOR_ID for this field.
url - Maps directly to the APP_POOL.INTERNAL_URL field.
host - Maps directly to the APP_POOL.HOST field.

DLS Database API

Figure 4A:
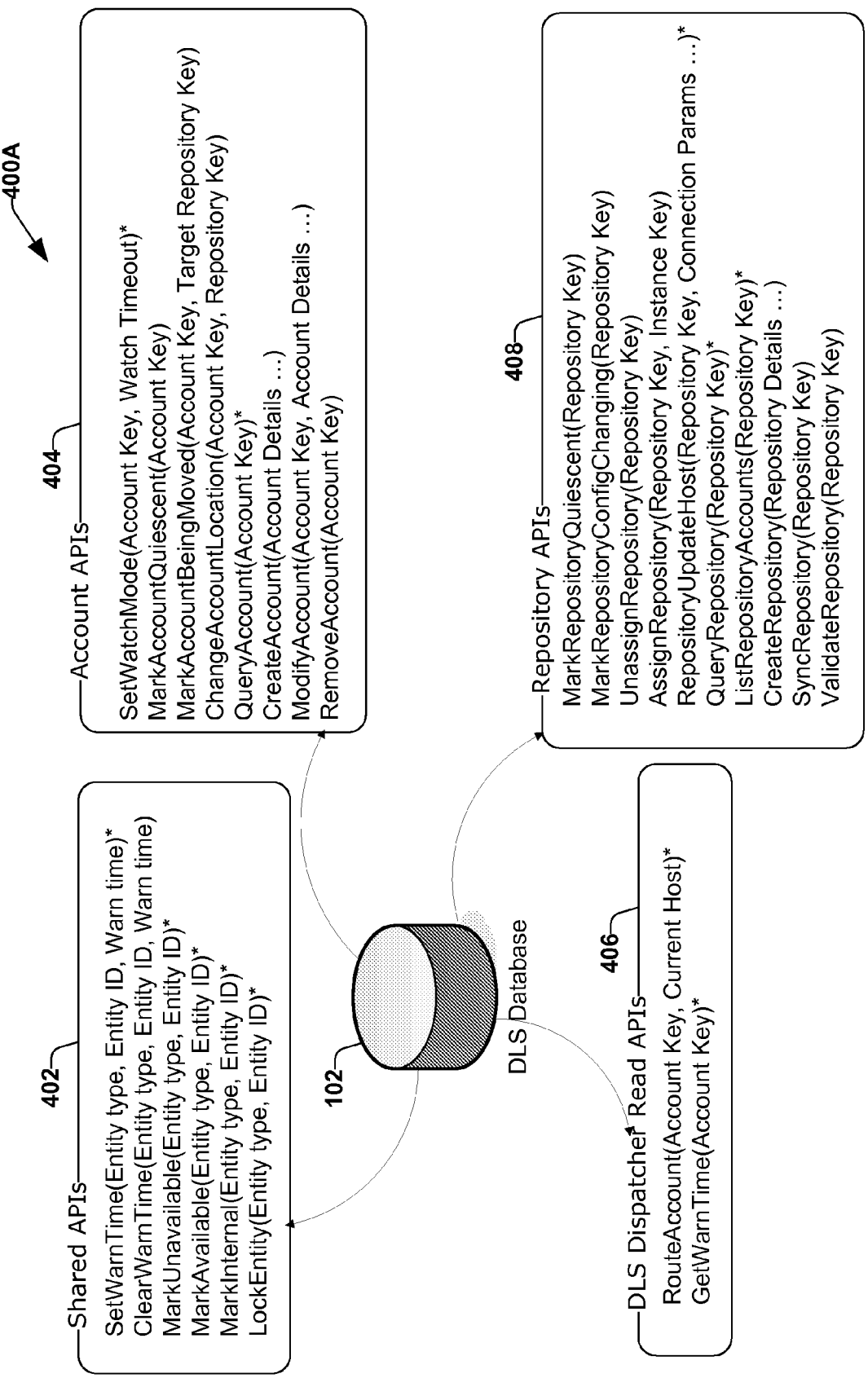
FIG. 4A-4B illustrate an exemplary non-limiting API for enforcing entity state transitions according to one aspect of the present invention.
Figure 4B:
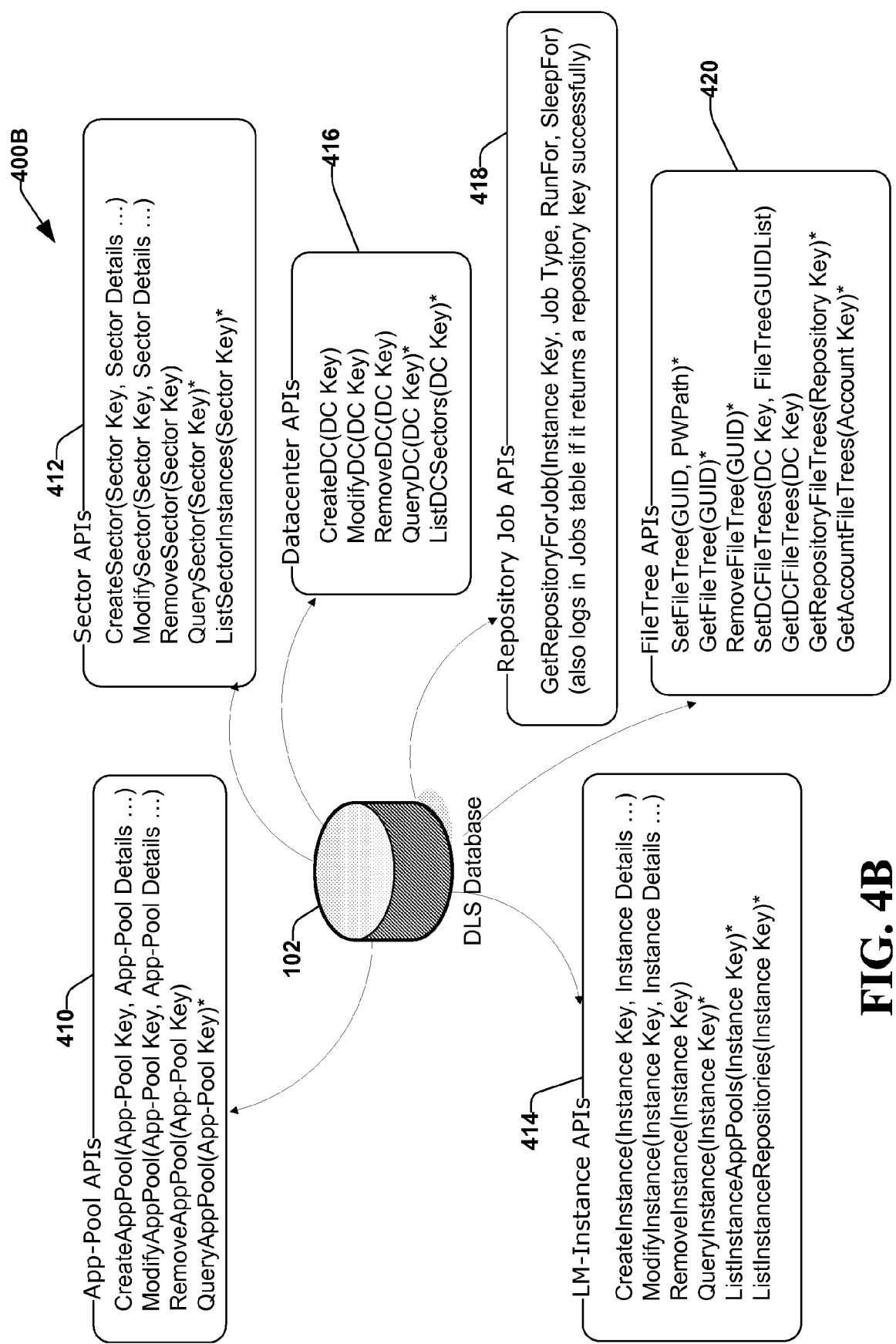

FIGS. 4A-4B illustrate an exemplary non-limiting API for enforcing entity state transitions according to one aspect of the present invention. According to a particular embodiment of the invention, the APIs can be implemented as stored procedures of the DLS database 102 for various internal tools to access the status of entities in the system. Advantageously, the API guarantees atomicity of service transactions to further enforce valid state transitions. For example, DLS Dispatcher Read APIs 406 contains the atomic call RouteAccount(Account Key, Current Host), without which a user of the API could check an entity's availability and some arbitrary time later could access that entity even if, in the meantime, the entity had become unavailable.

According to a further embodiment, the APIs marked by an asterisk ("*") in FIGS. 4A-4B can be made public and accessible to a service host, whereas the remainder can be made internal for use by internal tools and applications released only to the service host. Furthermore, according to one aspect of the invention, the tools and applications can be forbidden to update the service entities directly without using the APIs provided in FIGS. 4A and 4B. As a result, the invention can advantageously enforce an order for setting status values for various entities and only allow those transitions that are valid.

According to a further aspect of the invention, the set status stored procedures of the DLS API, following a naming convention (e.g., rsp_<entity>_setstatus_<status>), return an error if the transition is not valid, illustrating the functions' atomic nature to further enforce valid state transitions.

According to a further aspect of the invention, a command line utility can be employed to wrap all the public DLS APIs exposed to a service host (those indicated by an asterisk). A precheck for such a DLS set status utility can, for example, check if the provided destination status for the entity is allowed from the current state of the entity and check if the entity or any of its parents is 'Locked' in which case state changes are disallowed. Note that the only state change that should be allowed on an entity when it is locked is 'Unlock' and that is allowed only when none of its parents are in the 'Locked' state. The only exception to the above rule is when the entity is currently in an unstable state and the setstatus is trying to move it to a stable state (only allowed from internal tools and not exposed to the command line tool).

Service Entity State Machine Diagrams

FIGS. 5A-5I show exemplary non-limiting state transition diagrams for all the valid transitions of activity levels and a list of applications that are allowed to run in each state as well as the tools that can trigger a transition for all entities.

According to an aspect of the invention, each entity (e.g., datacenter, sector, etc.) has a state associated with it as implemented in the database stored procedures. These states can be determined by the aggregation of one or more state columns. According to a further aspect of the invention, there can be two types of state: current and cascaded. FIG. 5J illustrates an exemplary current state matrix 500J of possible states for various service entities according to an embodiment of the present invention. The current state 500J, for example, is simply the state of an entity, taking only that entity's state columns into consideration. For example, if a sector's (504) availability column is "available" and its parent datacenter's (502) availability column is "unavailable", the sector's (504) current state is "available". According to a further aspect of the invention, the repository 508 state "datachanging" (marked by an asterisk "*") is special in that it looks at its child entities (e.g., accounts 510). A repository 508 is in this state if any accounts 510 in the repository are in the "beingcreated" or "beingmoved" state.

Figure 5A:
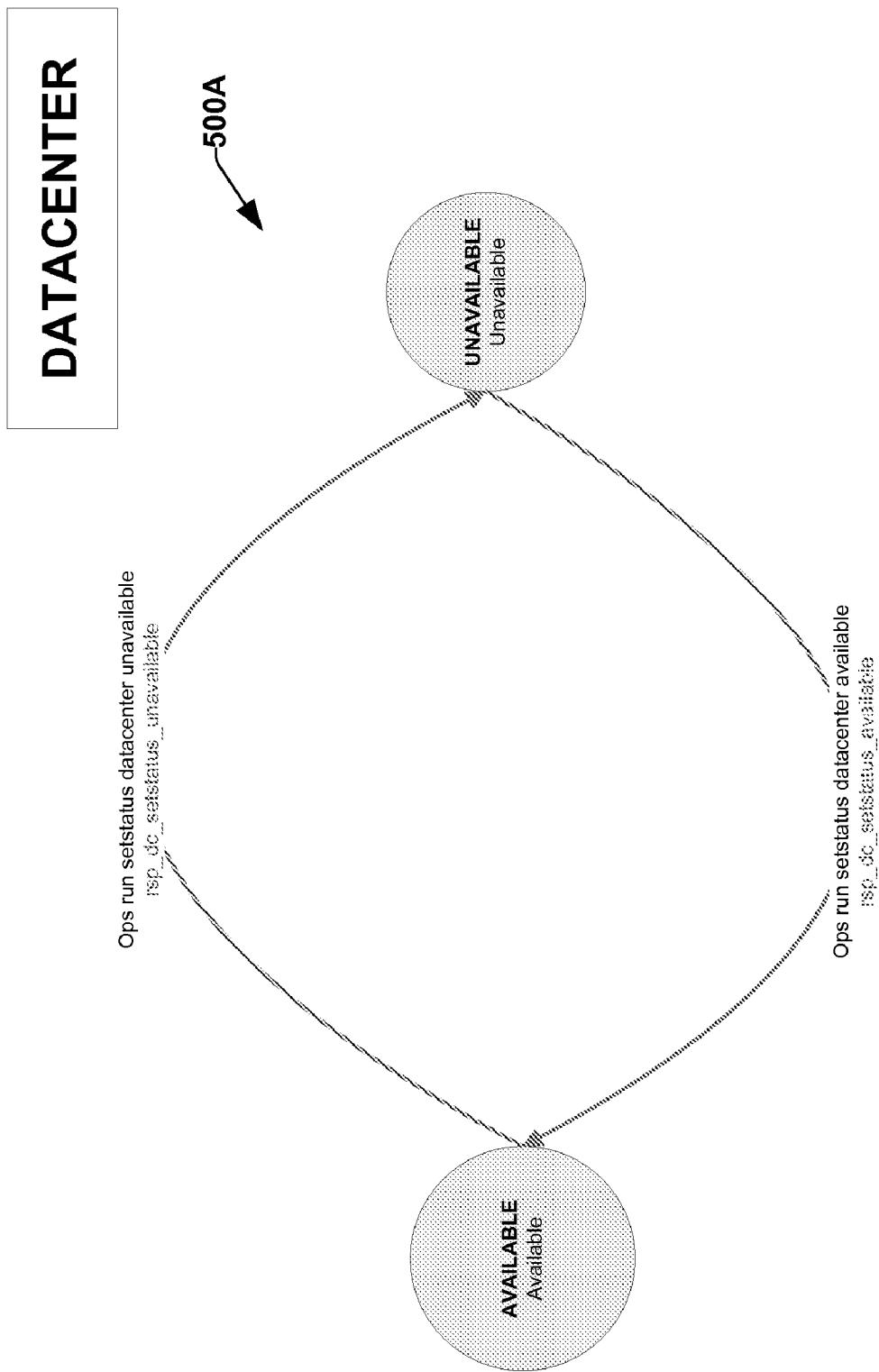
FIG. 5A-5I illustrate exemplary non-limiting state diagrams of various service entities according to the exemplary non-limiting API of the present invention.
Figure 5B:
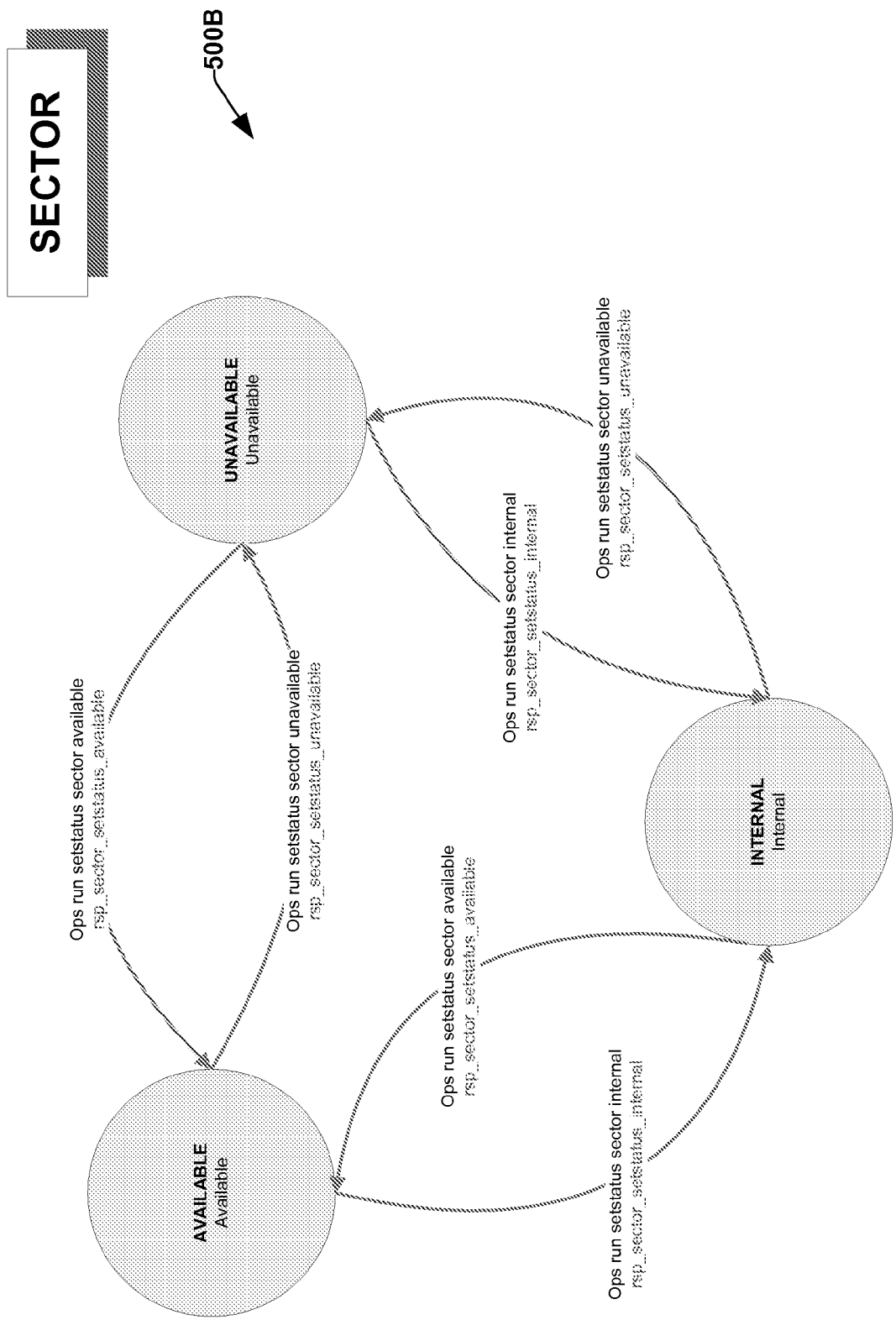
Figure 5C:
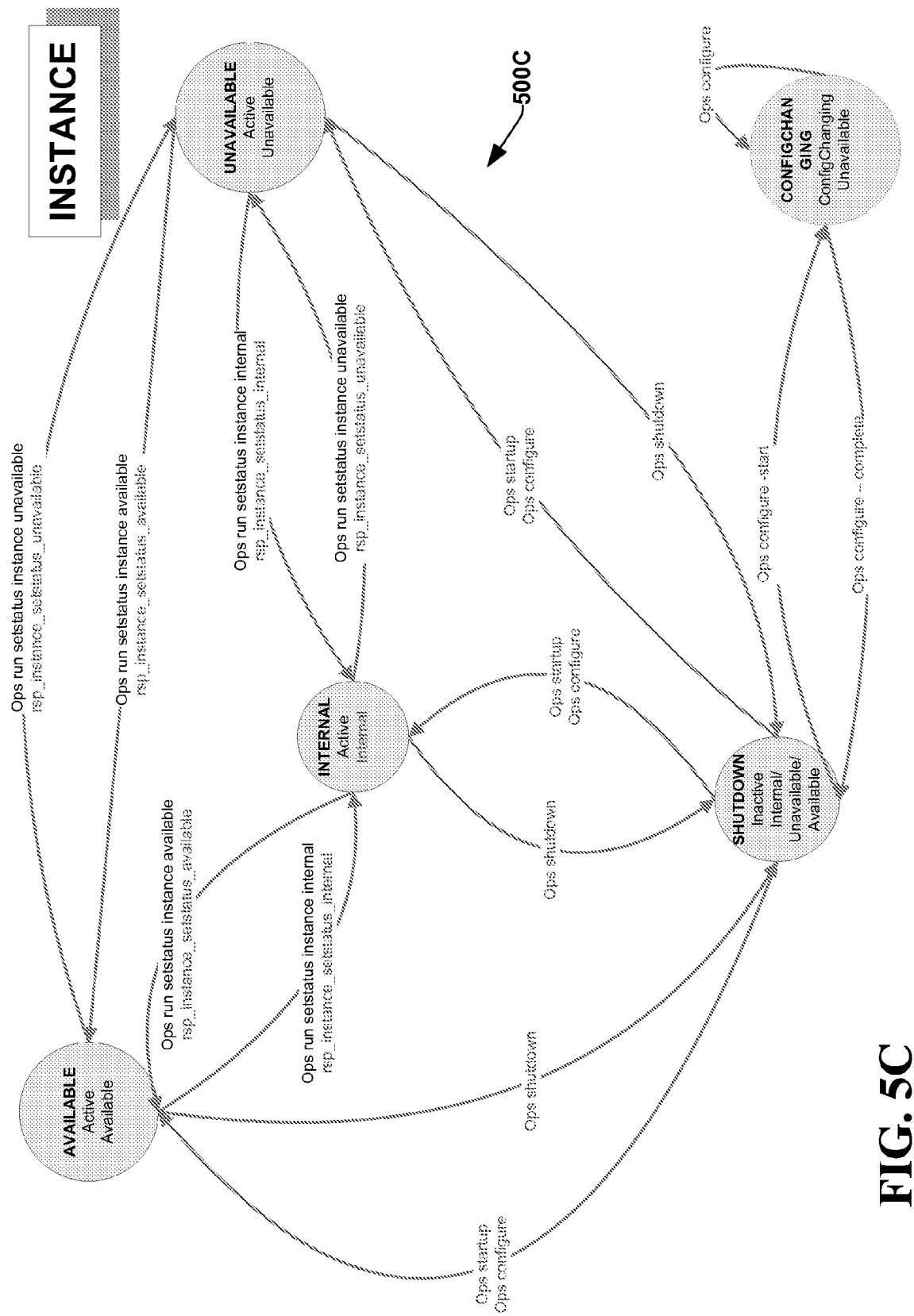
Figure 5D:
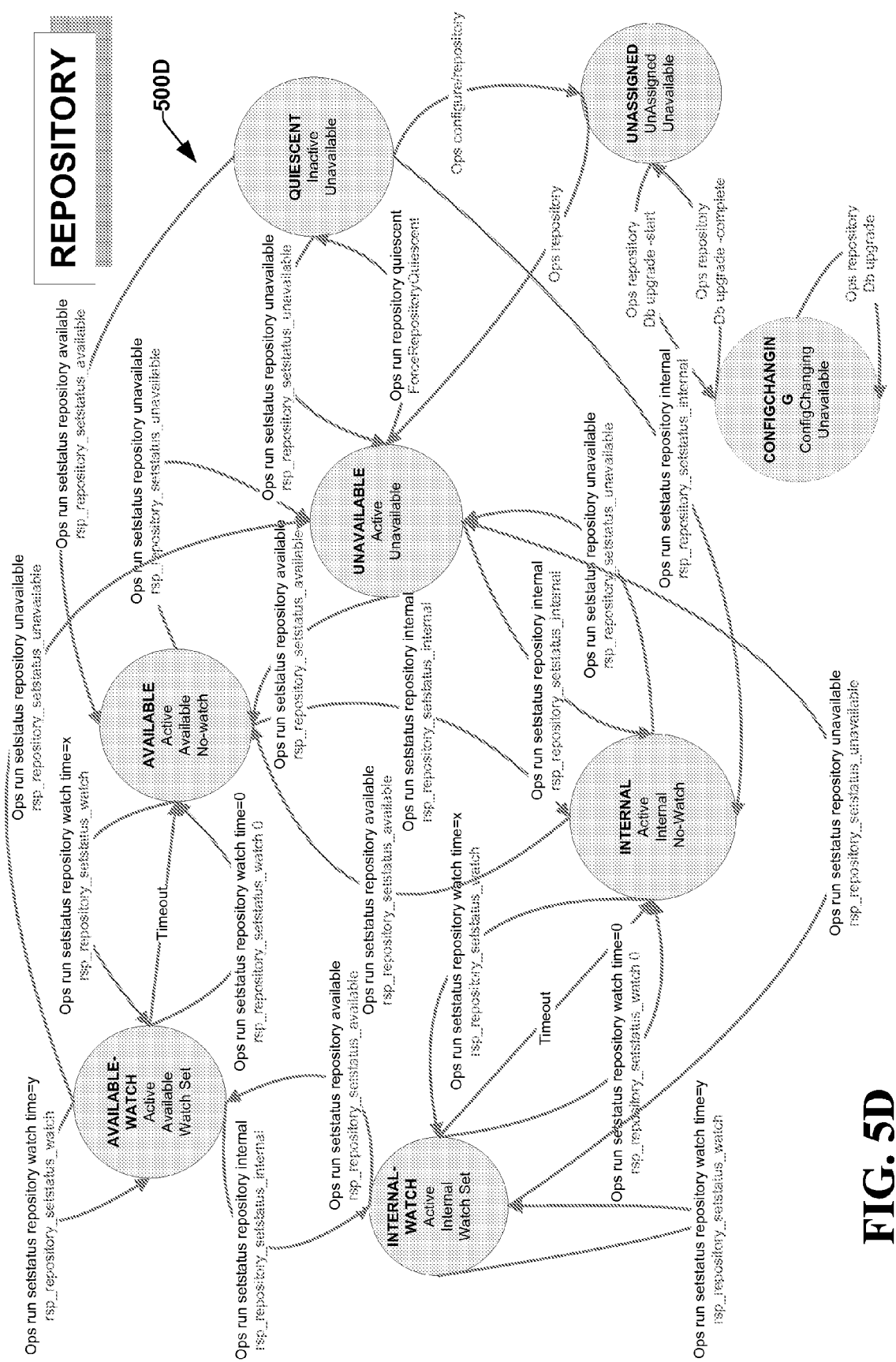
Figure 5E:
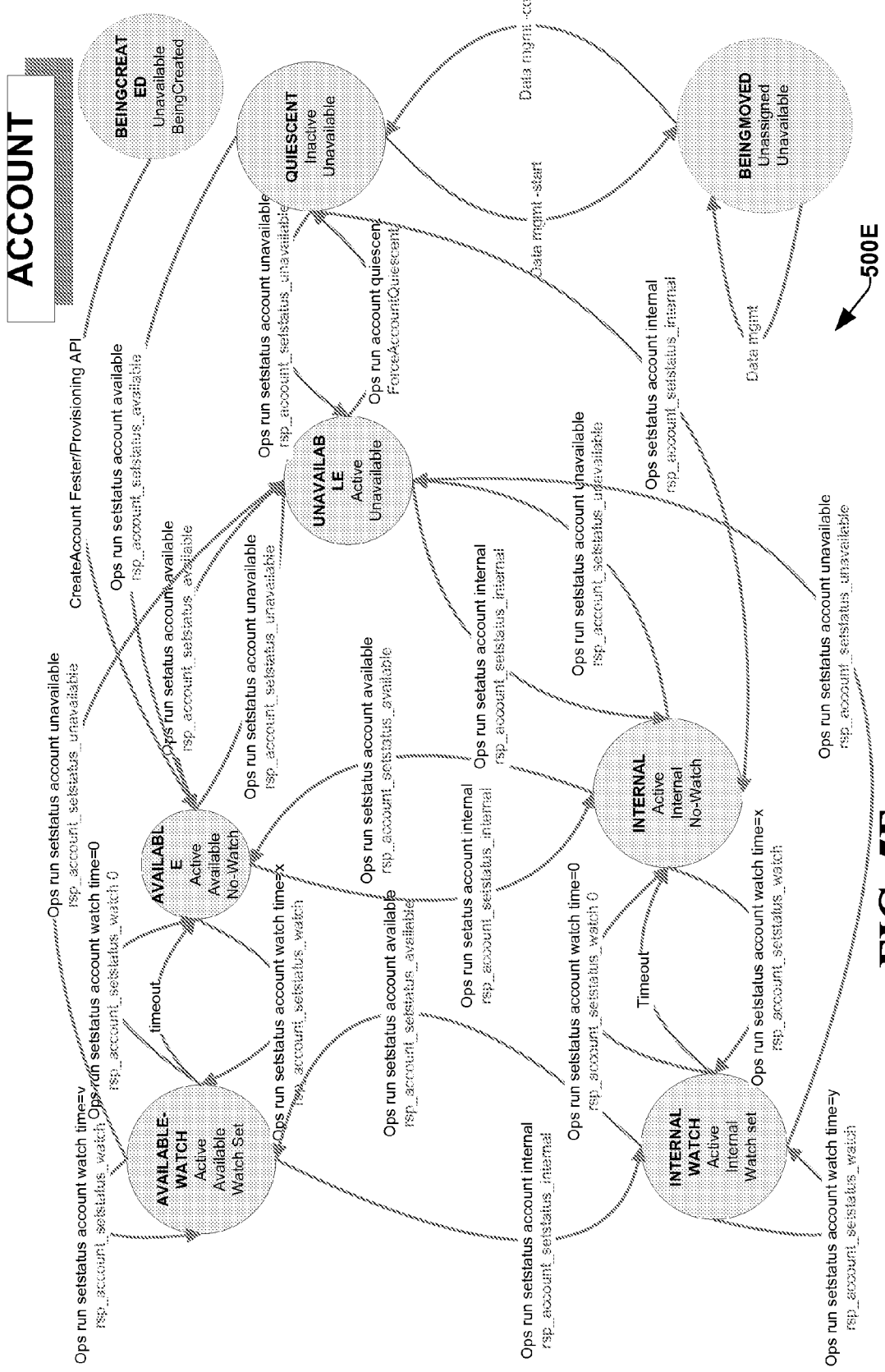
Figure 5F:
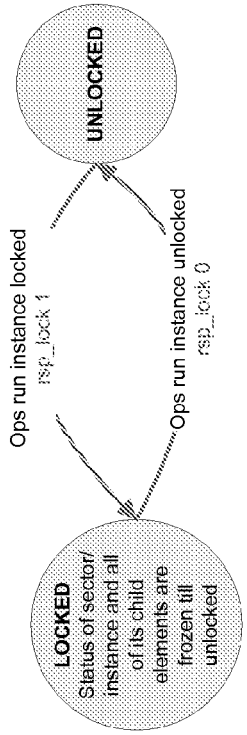
Figure 5H:
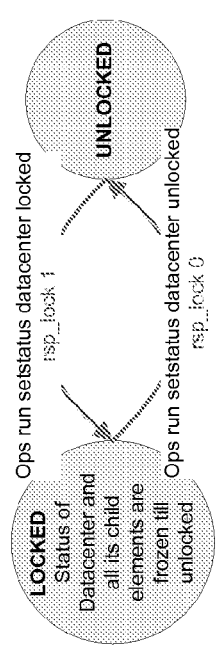
Figure 5G:
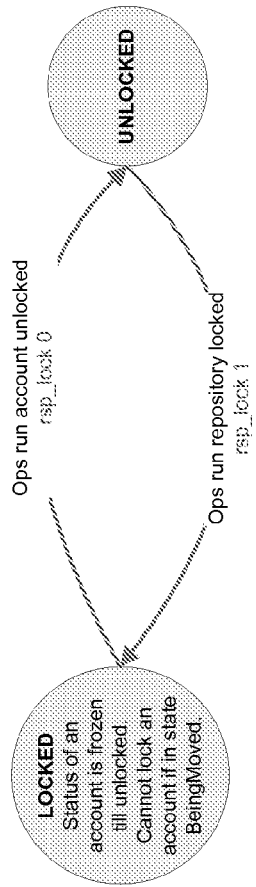
Figure 5I:
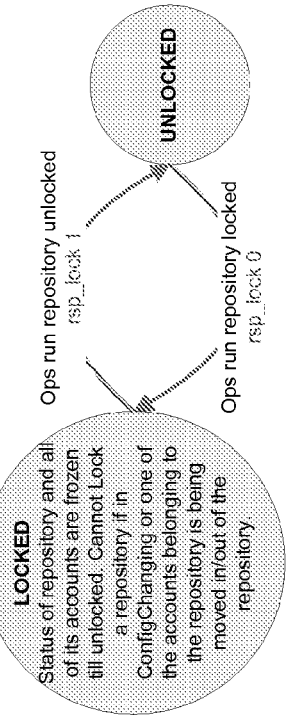
Figure 5K:
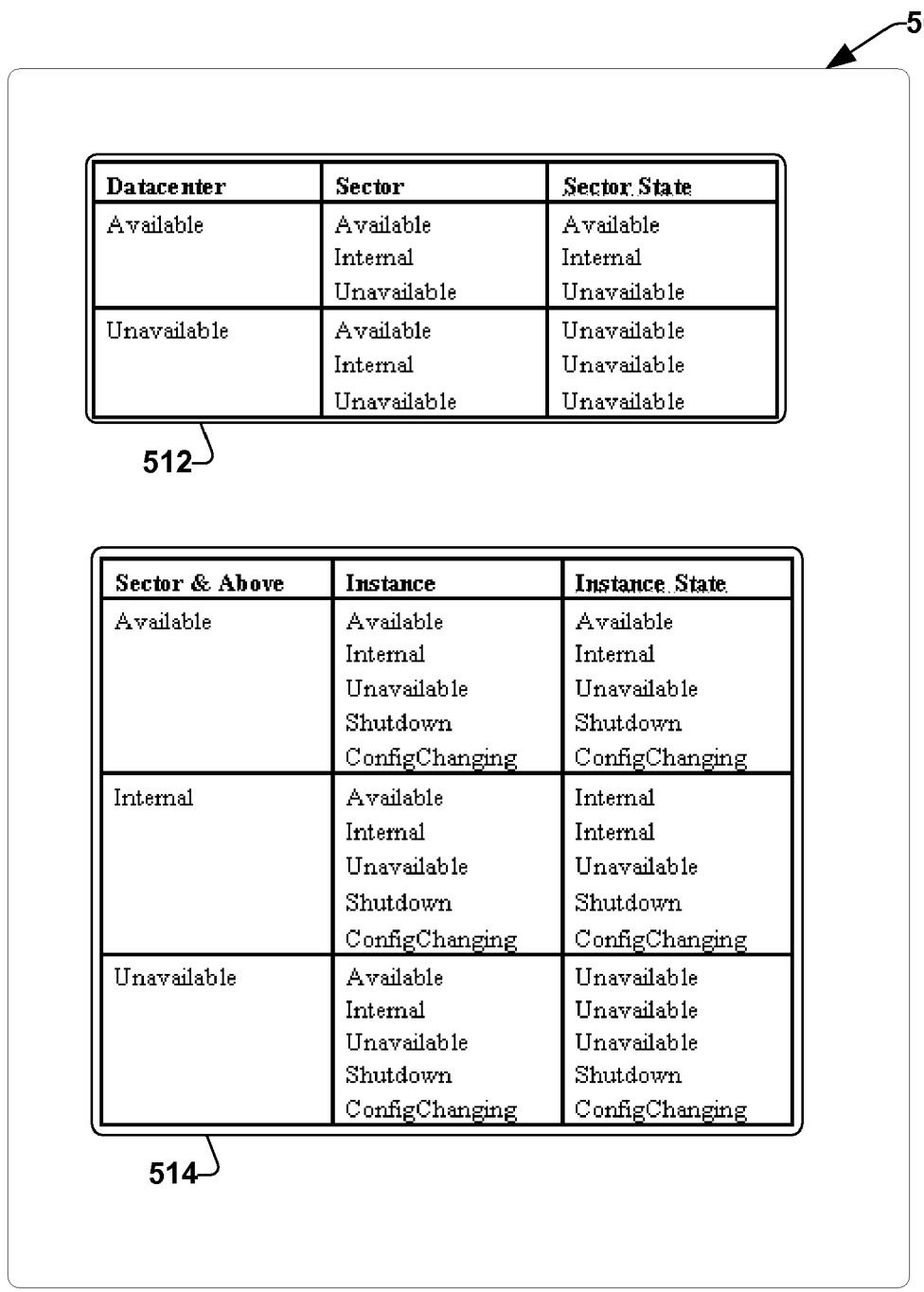

FIGS. 5K-5M illustrate an exemplary cascaded state matrix of possible states (500K, 500L, 500M) and how the cascaded states are derived for various service entities according to an embodiment of the present invention. The cascaded state is the state of an entity, taking the states of all of its parent entities into consideration. The cascaded states (512, 514, 516, 518) of the various entities are derived as described above, with the cascaded states marked by an asterisk ("*") indicating unintuitive cascaded states according to one aspect of the present invention. Looking at the previous example, the cascaded state (512) of the sector (504) is "unavailable".

According to one embodiment, the external state represented in the state diagrams can be stored as composite values in the following columns in the database as shown in Table 21 and FIG. 3.

1. Activity—Active, Inactive, ConfigChanging, Unassigned (Not available for Datacenter and Sector—since the only allowed value for those entities for this field is Active)
2. Availability—Available, Unavailable, Internal
3. Watch—Datetime value (only available for Repository and Account)

Table 21. Storage of Entity States in the DLS Database

According to a further embodiment, the DataChanging state of a repository is derived and not stored in the database. For example, a repository can be determined to be in DataChanging state (along with any other state shown in the state diagram for repository) when either: a) one or more accounts are being moved out (Account Status is Being-Moved) of the repository; or b) one or more accounts are being moved (Account Status is BeingMoved) into the repository. DataChanging can be reported when the repository is Quiescent and not otherwise. Since it is a parallel state, the other active states can override DataChanging—which means, for example, that the repository can be Available and DataChanging but DataChanging is not reported—the status reported is Available since the repository can be accessed by all the applications. DataChanging may be reported when the repository is inactive (e.g., Quiescent). As a result, according to a particular embodiment, when the repository is Quiescent and DataChanging, it is reported as DataChanging. When the repository is reported DataChanging (when it is Quiescent and DataChanging), the state cannot be changed to other inactive states—ConfigChanging.

In addition to the states described, in a particular embodiment, the business activity of an account can be set to 'Suspended' or 'Deactivated' in which case all activity on that account is forbidden.

According to a further embodiment, a state called 'Internal' can be used to enable testing of a Repository/Account when it is still cutoff from the external world (Not Active). For example, when an entity is in this state, only those requests that originate from a set of restricted IP addresses may be allowed access to the application. All external requests can be directed to a Maintenance URL.

According to a further embodiment, a 'Locked' state can be provided (FIGS. 5F-5I) to Lock an entity to ensure that no state changes are allowed and guarantees to hold the current state of the entity. Advantageously, this enables a type of safety switch that can disallow running any tool while holding the current status of the entity (and therefore all its child entities) whether the status is Available or Unavailable. For example, if an entity is Available and Locked, all external client requests can be honored while disallowing running of any tool including an ops shutdown tool. Also, if an entity state is Unavailable and Locked, all requests are routed to a maintenance page, and none of the tools are allowed to run, including ops configure tool. This can be used by a service host to ensure that no tools are accidentally run on a sector/account servicing a priority 1 customer (e.g., a 24/7 availability customer).

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with a highly available central controller to store and enforce valid state transitions of distributed components in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes. A central controller, and thus some of the techniques for storing and enforcing valid state transitions of distributed components in accordance with the present invention can be applied with great efficacy in those environments.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for a highly available central controller that stores and enforces valid state transitions of distributed components of the invention.

Figure 6:
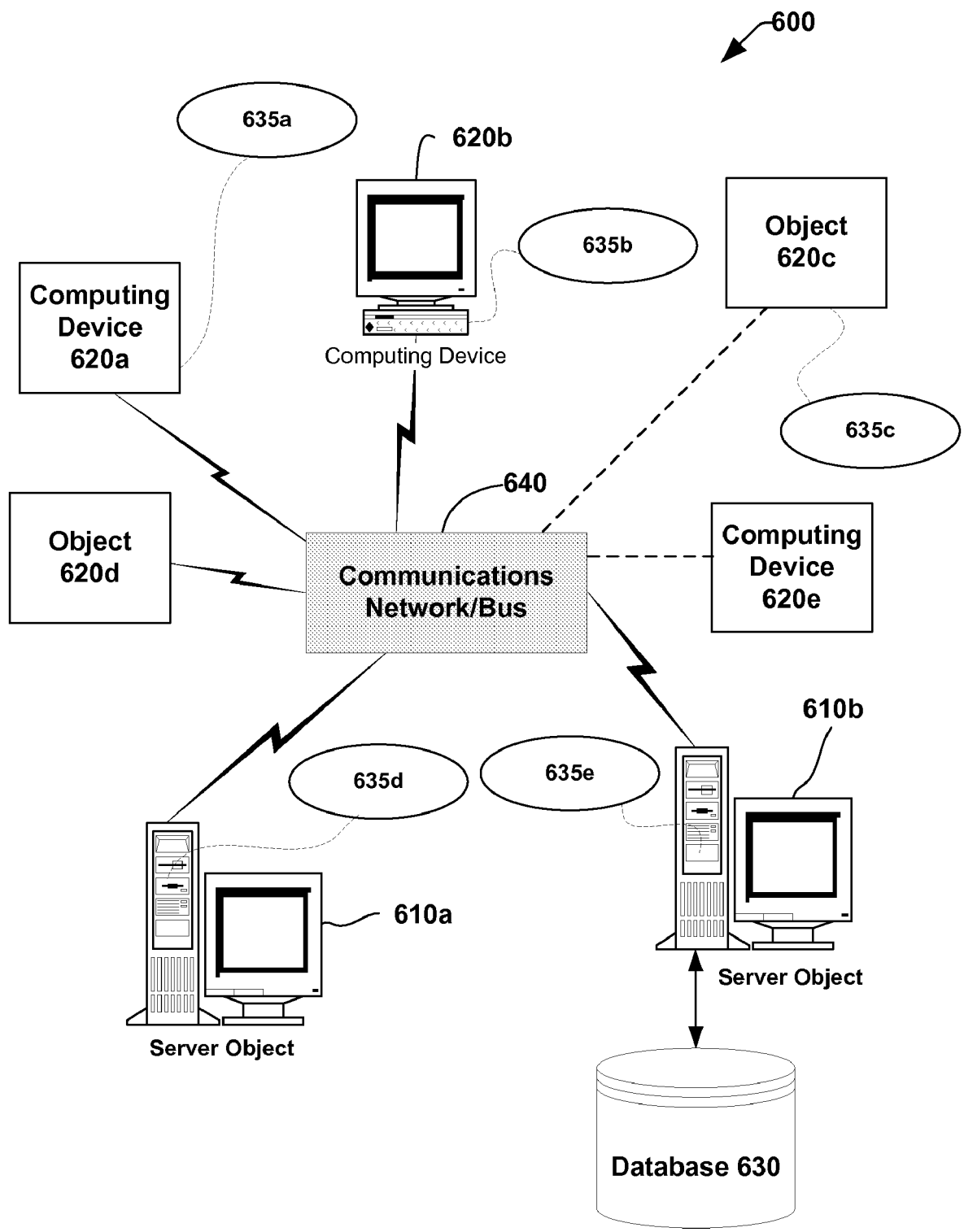
FIG. 6 is a block diagram representing an exemplary non-limiting networked environment in which the present invention may be implemented.

FIG. 6 provides a schematic diagram of an exemplary networked or distributed computing environment. The distributed computing environment comprises computing objects 610a, 610b, etc. and computing objects or devices 620a, 620b, 620c, 620d, 620e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 640. This network may itself comprise other computing objects and computing devices that provide services to the system of FIG. 6, and may itself represent multiple interconnected networks. In accordance with an aspect of the invention, each object 610a, 610b, etc. or 620a, 620b, 620c, 620d, 620e, etc. may contain an application that might make use of an API, or other object, software, firmware and/or hardware, suitable for use with the systems and methods for a highly available central controller that store and enforce valid state transitions of distributed components in accordance with the invention.

It can also be appreciated that an object, such as 620c, may be hosted on another computing device 610a, 610b, etc. or 620a, 620b, 620c, 620d, 620e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the controller according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/ Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 6, as an example, computers 620a, 620b, 620c, 620d, 620e, etc. can be thought of as clients and computers 610a, 610b, etc. can be thought of as servers where servers 610a, 610b, etc. maintain the data that is then replicated to client computers 620a, 620b, 620c, 620d, 620e, etc., although any computer can be considered a client, a server, or both, depending on the circumstances. Any of these computing devices may be processing data or requesting services or tasks that may implicate the controller system or method in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. As a result some software objects utilized pursuant to the techniques for the controller of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 6 illustrates an exemplary networked or distributed environment, with server(s) in communication with client computer (s) via a network/bus, in which the present invention may be employed. In more detail, a number of servers 610a, 610b, etc. are interconnected via a communications network/bus 640, which may be a LAN, WAN, intranet, GSM network, the Internet, etc., with a number of client or remote computing devices 620a, 620b, 620c, 620d, 620e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to control access to a service.

In a network environment in which the communications network/bus 640 is the Internet, for example, the servers 610a, 610b, etc. can be Web servers with which the clients 620a, 620b, 620c, 620d, 620e, etc. communicate via any of a number of known protocols such as HTTP. Servers 610a, 610b, etc. may also serve as clients 620a, 620b, 620c, 620d, 620e, etc., as may be characteristic of a distributed computing environment.

As mentioned, communications may be wired or wireless, or a combination, where appropriate. Client devices 620a, 620b, 620c, 620d, 620e, etc. may or may not communicate via communications network/bus 14, and may have independent communications associated therewith. For example, in the case of a TV or VCR, there may or may not be a networked aspect to the control thereof. Each client computer 620a, 620b, 620c, 620d, 620e, etc. and server computer 610a, 610b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 610a, 610b, 620a, 620b, 620c, 620d, 620e, etc. may be responsible for the maintenance and updating of a database 630 or other storage element, such as a database or memory 630 for storing data processed or saved according to the invention. Thus, the present invention can be utilized in a computer network environment having client computers 620a, 620b, 620c, 620d, 620e, etc. that can access and interact with a computer network/bus 640 and server computers 610a, 610b, etc. that may interact with client computers 620a, 620b, 620c, 620d, 620e, etc. and other like devices, and databases 630.

Exemplary Computing Device

As mentioned, the invention applies to any device wherein it may be desirable to control access to a service. It should be understood, therefore, that handheld, portable and other computing devices and computing objects of all kinds are contemplated for use in connection with the present invention, i.e., anywhere that a device may request or receive, process or store data. Accordingly, the below general purpose remote computer described below in FIG. 7 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 7 thus illustrates an example of a suitable computing system environment 700a in which the invention may be implemented, although as made clear above, the computing system environment 700a is only one example of a suitable computing environment for a media device and is not intended to suggest any limitation as to the scope of use or functionality of the invention. Neither should the computing environment 700a be interpreted as having any dependency or requirement relating to any one or combination of components illustrated in the exemplary operating environment 700a.

With reference to FIG. 7, an exemplary remote device for implementing the invention includes a general purpose computing device in the form of a computer 710a. Components of computer 710a may include, but are not limited to, a processing unit 720a, a system memory 730a, and a system bus 721a that couples various system components including the system memory to the processing unit 720a. The system bus 721a may be any of several types of bus structures including a memory bus or memory controller, a peripheral bus, and a local bus using any of a variety of bus architectures.

Computer 710a typically includes a variety of computer readable media. Computer readable media can be any available media that can be accessed by computer 710a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 710a. Communication media typically embodies computer readable instructions, data structures, program modules or other data in a modulated data signal such as a carrier wave or other transport mechanism and includes any information delivery media.

The system memory 730a may include computer storage media in the form of volatile and/or nonvolatile memory such as read only memory (ROM) and/or random access memory (RAM). A basic input/output system (BIOS), containing the basic routines that help to transfer information between elements within computer 710a, such as during start-up, may be stored in memory 730a. Memory 730a typically also contains data and/or program modules that are immediately accessible to and/or presently being operated on by processing unit 720a. By way of example, and not limitation, memory 730a may also include an operating system, application programs, other program modules, and program data.

The computer 710a may also include other removable/non-removable, volatile/nonvolatile computer storage media. For example, computer 710a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 721a through a non-removable memory interface such as an interface, and a magnetic disk drive or optical disk drive is typically connected to the system bus 721a by a removable memory interface, such as an interface.

A user may enter commands and information into the computer 710a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 720a through user input 740a and associated interface(s) that are coupled to the system bus 721a, but may be connected by other interface and bus structures, such as a parallel port, game port or a universal serial bus (USB). A graphics subsystem may also be connected to the system bus 721a. A monitor or other type of display device is also connected to the system bus 721a via an interface, such as output interface 750a, which may in turn communicate with video memory. In addition to a monitor, computers may also include other peripheral output devices such as speakers and a printer, which may be connected through output interface 750a.

The computer 710a may operate in a networked or distributed environment using logical connections to one or more other remote computers, such as remote computer 770a, which may in turn have media capabilities different from device 710a. The remote computer 770a may be a personal computer, a server, a router, a network PC, a peer device or other common network node, or any other remote media consumption or transmission device, and may include any or all of the elements described above relative to the computer 710a. The logical connections depicted in FIG. 7 include a network 771a, such local area network (LAN) or a wide area network (WAN), but may also include other networks/buses. Such networking environments are commonplace in homes, offices, enterprise-wide computer networks, intranets and the Internet.

When used in a LAN networking environment, the computer 710a is connected to the LAN 771a through a network interface or adapter. When used in a WAN networking environment, the computer 710a typically includes a communications component, such as a modem, or other means for establishing communications over the WAN, such as the Internet. A communications component, such as a modem, which may be internal or external, may be connected to the system bus 721a via the user input interface of input 740a, or other appropriate mechanism. In a networked environment, program modules depicted relative to the computer 710a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for controlling access in accordance with the invention may be included in, supported in or accessed via all of the languages and services enabled by managed code, such as .NET code, and in other distributed computing frameworks as well.

There may be multiple ways of implementing the present invention, e.g., an appropriate API, tool kit, driver code, operating system, control, standalone or downloadable software object, etc. which enables applications and services to use the systems and methods for controlling access to a service in accordance with the invention. The invention contemplates the use of the invention from the standpoint of an API (or other software object), as well as from a software or hardware object that stores and enforces valid state transitions in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to control access to a service. For instance, the controller of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the controller of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts, tables, and diagrams of FIGS. 1-7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments may refer to utilizing the present invention in the context of particular programming language constructs, the invention is not so limited, but rather may be implemented in any language to provide methods for a highly available central controller to store and enforce valid state transitions of distributed components. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method to provide centralized control of access to a service, the computer-implemented method comprising:
   executing on a processor, computer-executable instructions that, when executed, cause the processor to perform:
      storing, in a central database, one or more entity states of the service;
      receiving one or more requests to read or manipulate said one or more entity states;
      providing a virtual view of said one or more entity states of the service to facilitate handling said one or more requests to read or manipulate said one or more entity states of the service; and
      enforcing one or more valid entity state transitions in response to receiving said one or more requests,
      the one or more entity states comprising a locked state and an internal state that enables testing in response to one of the one or more requests if the one of the one or more requests originates from a restricted set of internet protocol addresses.

2. The computer-implemented method of claim 1, further comprising updating said one or more entity states in said virtual view in response to handling said one or more requests for said one or more valid entity state transitions.

3. The computer-implemented method of claim 1, further comprising disallowing one or more invalid entity state transitions.

4. The computer-implemented method of claim 1, wherein said one or more requests is an external client request that is routed according to service entity state information.

5. The computer-implemented method of claim 1, wherein said one or more requests is an internal service entity management tool request.

6. The computer-implemented method of claim 1, wherein said virtual view is provided by an application program interface of the service.

7. The computer-implemented method of claim 6, wherein said application program interface contains logic to enforce said one or more valid entity state transitions.

8. The computer-implemented method of claim 6, wherein said application program interface comprises a set of procedures stored in the central database, wherein one or more of the procedures route requests and update respective entity states in the central database.

9. The computer-implemented method of claim 8, further comprising generating a database schema to store in the central database, a status enumeration of the one or more entity states of the service.

10. A non-transitory computer-readable storage medium storing computer-executable instructions that, when executed on a processor, cause the processor to perform the method of claim 1.

11. A computing device comprising a central controller comprising a non-transitory computer-readable storage medium storing computer-executable instructions that, when executed, cause the central controller to perform the method of claim 1.

12. A user interface adapted to facilitate provisioning of centralized control of access to a service, the user interface comprising:
 a processor;
 a request receiving component configured to receive one or more requests to read or manipulate one or more entity states of the service;
 an enforcing component configured to enforce one or more valid entity state transitions in response to the request receiving component receiving said one or more requests,
 said one or more requests being formed according to a virtual view of said one or more entity states of the service provided to one or more requestors of said service, and
 the one or more entity states comprising a locked state and an internal state that enables testing in response to one of the one or more requests if the one of the one or more requests originates from a restricted set of internet protocol addresses; and
 a non-transitory computer-readable storage medium storing instructions that, when executed by the processor, cause the processor to implement at least one of the request receiving component or the enforcing component.

13. The user interface of claim 12, further comprising an entity state updating component configured to update said one or more entity states in said virtual view in response to receiving said one or more requests.

14. The user interface of claim 12, wherein at least one of the request receiving component or the enforcing component is provided by, at least, a set of database-stored procedures of a central database that is configured to control access to the service.

15. The user interface of claim 14, wherein said virtual view is provided to said one or more requestors according to a status enumeration of said one or more entity states of the service stored in the central database.

16. One or more non-transitory computer storage media comprising computer-executable instructions that, when executed by a processor, cause the processor to transmit a data packet between two or more computer components, wherein the data packet comprises:
 information associated with a request to read or manipulate one or more entity states of a service according to a virtual view of said one or more entity states provided to a requestor to enforce one or more valid service entity state transitions, the one or more entity states comprising an internal state that enables testing in response to one of the one or more requests if the one of the one or more requests originates from a restricted set of internet protocol addresses.

17. A computer-implemented system configured to provide centralized control of access to a service, the computer-implemented system comprising:
 a database configured to centrally store at least one entity state of the service;
 a request receiving component configured to receive at least one request to read or manipulate the at least one entity state of the service;
 an enforcing component configured to enforce at least one valid entity state transition in response to receiving said at least one request;
 at least one account entity associated with providing said service;
 at least one repository entity configured to store said at least one account entity, said at least one request being formed according to a virtual view of at least one account entity state or at least one repository entity state;
 a processor, and the one or more entity states comprising a locked state and an internal state that enables testing in response to one of the one or more requests if the one of the one or more requests originates from a restricted set of internet protocol addresses; and
 one or more non-transitory computer storage media storing instructions that, when executed by the processor, cause the processor to implement at least one of the database, the request receiving component, the enforcing component, the at least one account entity or the at least one repository entity.

18. The computer-implemented system of claim 17, further comprising an entity state updating component configured to update said at least one entity state in said virtual view in response to handling said at least one request.

19. The computer-implemented system of claim 17, wherein at least one of the request receiving component or the enforcing component is configured to be provided according to, at least, a set of procedures stored in the database.

20. The computer-implemented system of claim 19, wherein said virtual view is configured to be provided to a requestor according to a status enumeration of the at least one entity state of the service.

* * * * *